United States Patent [19]
Matsumoto et al.

[11] Patent Number: 5,859,624
[45] Date of Patent: Jan. 12, 1999

[54] BINOCULAR DISPLAY GOGGLES WITH A ONE DIMENSIONAL LIGHT SOURCE ARRAY SCANNED TO FORM IMAGE OF HIGH DOT DENSITY DATA

[75] Inventors: Takashi Matsumoto; Tatsuhiro Nozue, both of Yokohama; Shigehiro Tomita, Sayama; Hiromi Harada, Yokohama, all of Japan

[73] Assignee: Hitachi, Ltd., Tokyo, Japan

[21] Appl. No.: 565,920

[22] Filed: Dec. 1, 1995

[30]     Foreign Application Priority Data

Dec. 2, 1994  [JP]  Japan .................................. 6-299748
Dec. 2, 1994  [JP]  Japan .................................. 6-299749

[51] Int. Cl.$^6$ ........................... G09G 5/00; G02B 26/08; G02B 27/14
[52] U.S. Cl. ............................... 345/8; 359/221; 359/633
[58] Field of Search .................... 345/7, 8, 9, 32, 345/48; 359/196, 197, 205, 206, 212, 213, 214, 215, 220, 221, 223, 225, 226, 630

[56]          References Cited

U.S. PATENT DOCUMENTS

| 4,097,115 | 6/1978 | Garwin et al. ......................... 359/221 |
| 4,457,580 | 7/1984 | Klose ....................................... 359/221 |
| 4,897,715 | 1/1990 | Beamon, III .............................. 345/8 |
| 4,934,773 | 6/1990 | Becker ....................................... 345/8 |
| 5,048,077 | 9/1991 | Wells et al. ............................... 379/96 |
| 5,091,719 | 2/1992 | Beamon, III .............................. 345/8 |
| 5,124,970 | 6/1992 | Sato et al. ............................... 369/112 |
| 5,155,615 | 10/1992 | Tagawa ..................................... 345/9 |
| 5,166,778 | 11/1992 | Beamon, III .............................. 345/8 |
| 5,334,991 | 8/1994 | Wells et al. ............................... 345/8 |
| 5,369,415 | 11/1994 | Richard et al. ........................... 345/7 |
| 5,610,765 | 3/1997 | Colucci .................................. 359/633 |
| 5,612,708 | 3/1997 | Ansley et al. ............................ 345/8 |

FOREIGN PATENT DOCUMENTS

A-2-42476  2/1990  Japan .
A-4-307590 10/1992  Japan .

OTHER PUBLICATIONS

Handbook of Human Engineering Standard Numerics and Equations, Apr. 20, 1992.

*Primary Examiner*—Jeffery Brier
*Assistant Examiner*—Paul A. Bell
*Attorney, Agent, or Firm*—Frohwitter

[57]          ABSTRACT

An information display apparatus comprising goggles and a terminal and having a dot density so high as to be capable of reproducing textual information is disclosed, in which the goggles include light sources, a fixed mirror and a rotary mirror arranged in such a manner as to satisfy predetermined conditions, and the data transmitted from the terminal are reproduced as an image.

4 Claims, 16 Drawing Sheets

FIG.4A
FIG.4C
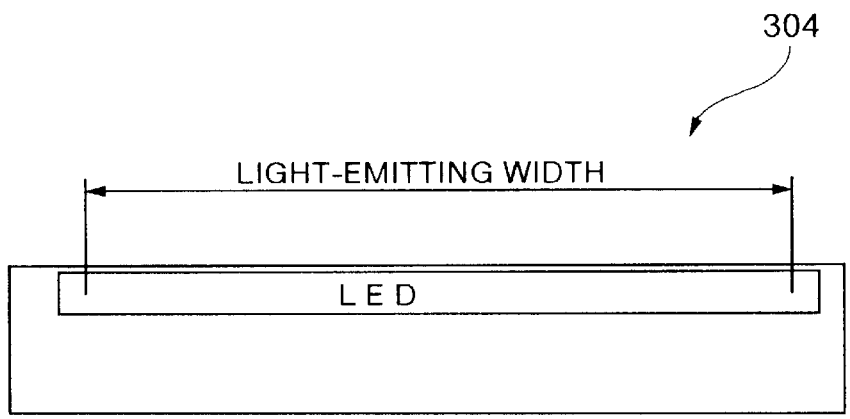
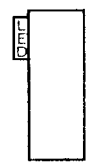
FIG.4B

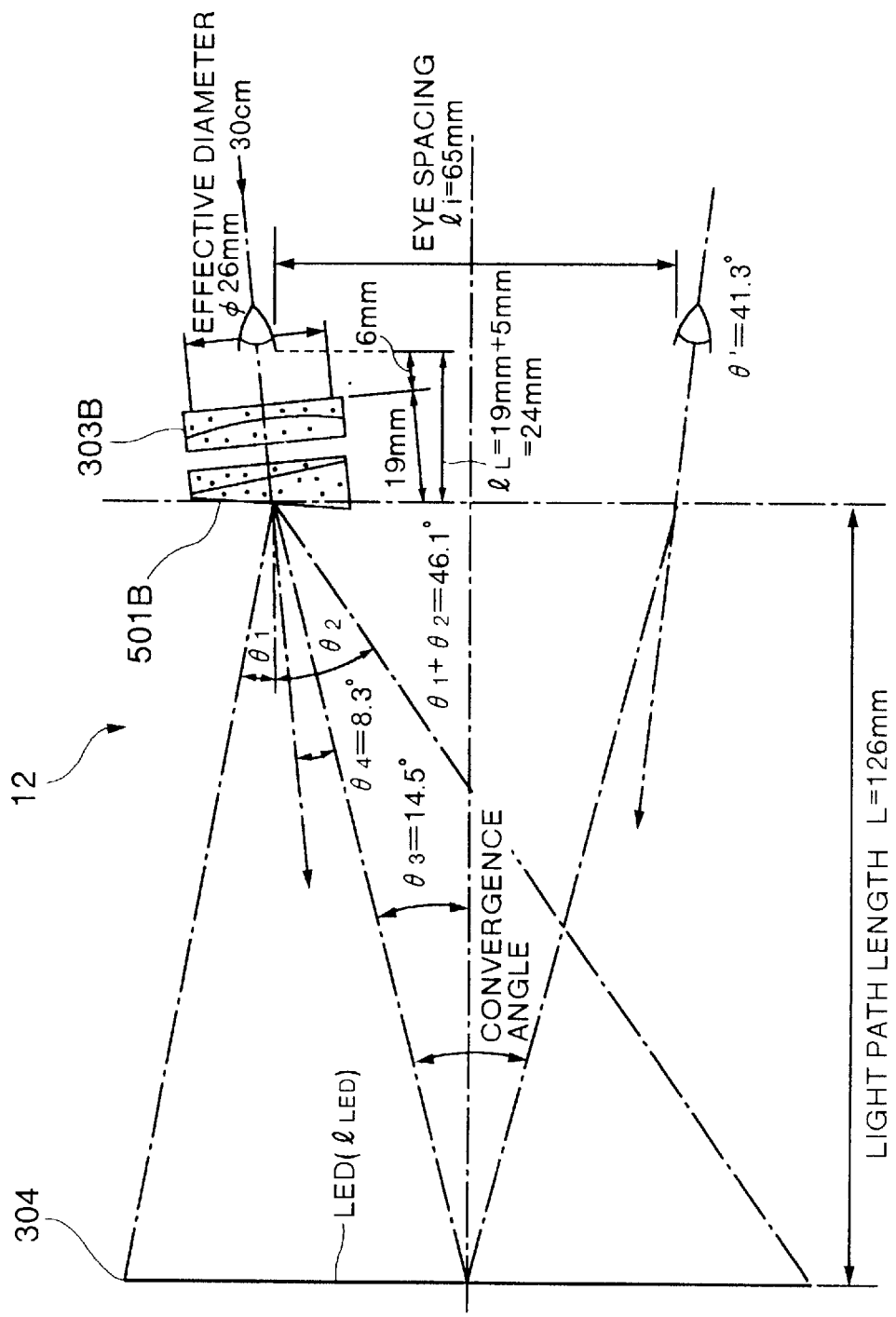

BINOCULAR DISPLAY GOGGLES WITH A ONE DIMENSIONAL LIGHT SOURCE ARRAY SCANNED TO FORM IMAGE OF HIGH DOT DENSITY DATA

BACKGROUND OF THE INVENTION

The present invention relates to a hand-held display apparatus for displaying image information using light sources.

A new information distribution system forms a background for developing this information display apparatus. The new information distribution system is one in which image information contained in a newspaper page produced by a newspaper publishing company (center station) is distributed to homes in various areas throughout a country using a satellite link. The most significant feature of the information distribution system is that the "paper" which has hitherto been a record medium for newspaper information and the like is replaced by electrical data from the beginning of distribution to realize what is called a paperless distribution system. At the same time, fresh newspaper information can be distributed over the whole country by taking advantage of simultaneity and broadcasting which are the greatest merits of the satellite communication.

Since the newspaper information handled by this information distribution system is configured of textual information such as titles, articles and advertisements on the one hand, and figure information such as photographs and illustrations, however, presentation of the newspaper information as dot images involves a vast number of dots. A high dot density is therefore required of display terminals for reproducing the newspaper information. The information display apparatus include, for example, a cold cathode-ray tube (CRT) and a liquid crystal display (LCD). An attempt to display the newspaper information on a CRT or an LCD undesirably increases the size of the apparatus under the circumstances.

In view of this situation, a system using an LED as described in JP-A-2-42476 has recently been closely watched. This is a system in which arbitrary information is emitted in the form of light as linear information from a linear array of LEDs, which linear information is sequentially deflected by a rotary or an oscillational mirror thereby to reproduce the newspaper information. Such a disclosure, however, fails to refer to the case in which a given LED array linearly arranged is visually recognized but suggests a system comprising two LED arrays, one each for the right and left eyes. The visual recognition with the right and left eyes is disclosed in JP-A-4-307590. Specifically, an array of light sources is arranged in the longitudinal direction of the viewer's face, the light emitted by the array of light sources is sequentially reflected in lateral direction by a rotary mirror, and the output light deflected by the rotary mirror is further deflected by a pair of fixed mirrors, one each on right and left sides, for deflecting the light toward the right and left eyes of the viewer. The above-mentioned publication also discloses the technique in which the output of the information display apparatus is deflected in time division by the rotary mirror thereby to display an image corresponding to the right and left eyes.

With the above-mentioned conventional system in which LEDs are visually recognized by right and left eyes, however, an LED array, a magnification lens and a rotary mirror are required to be arranged in a straight line, so that the information display apparatus is undesirably located considerably forward of the viewer. The LED array is also required to be arranged longitudinally of the viewer's face. Further, in the above-mentioned conventional system in which time-division requirement is met by a rotary mirror, displaying an image for the right and left eyes requires a period of time twice as long as normally required, and the displayed image is generally subjected to flickers. In other words, the conventional information display apparatuses are restricted by the size of the existing display elements when a certain degree of dot density is demanded. To meet such a demand, therefore, it is necessary either increase the system size or to employ a complicated structure.

SUMMARY OF THE INVENTION

An object of the invention is to provide an information display apparatus capable of achieving such a dot density as to be able to reproduce the textual information with a structure reduced in size to such a degree as to be mountable on the head.

Another object of the invention is to provide an information display apparatus in which newspaper information of A4 size can be reproduced with a dot density of at least 200 dpi with a structure reduced to such a degree as to be mountable on the head.

The conventional information display apparatuses using LEDs, which fail to take the size reduction into consideration, become bulky or complicated in structure due to the size restriction of the existing display elements if the requirement for a dot density of certain magnitude are to be met.

Still another object of the invention is to provide a structure of an information display apparatus using LEDs reduced in size to such a degree as to be mountable on the head.

According to one aspect of the invention, there is provided an information display apparatus having a structure reduced in size to such a degree as to be mountable on the head and a dot density improved to such a degree as to be capable of reproducing textual information, the apparatus comprising a light source device including a plurality of light sources arranged linearly, first and second lenses arranged symmetrically on right and left sides with respect to the center of the light source device, and a rotary mirror arranged on the optic axes of the first lens and the second lens, wherein the light emitted by the light source device is focused by means of the rotary mirror, and the focused image is visually recognized through the first and second lenses.

According to another aspect of the present invention, there is provided an information display apparatus having a structure reduced in size to such a degree as to be mountable on the head and capable of reproducing the information on the A4-size paper with a dot density of at least 200 dpi, comprising a light source device including a predetermined number of light sources arranged linearly in such a manner as to be capable of outputting the information on the A6-size paper containing textural information with the number of dots having a dot density of at least 400 dpi (dot/inch), a rotary mirror for focusing the light emitted by the light source device, and first and second lenses arranged laterally symmetrically with respect to the center of the light source device, wherein the light source device is arranged within the angular field of view of the first and second lenses, said angle of visibility being set to a predetermined angle, whereby the image formed by the rotary mirror is visually recognized through the first and the second lenses.

More specifically, according to the present invention, there is provided an information display apparatus comprising a light source device including a plurality of light sources the number of which is determined in such a manner as to satisfy a predetermined dot density, the light source device being arranged horizontally with respect to the right and left eyes in such a position that the light emitted by the light source device can be visually recognized by the two eyes of the viewer, first and second lenses arranged laterally symmetrically with respect to the center of the light source device, and a rotary mirror arranged on the optic axes of the first and second lenses in such a manner that the light emitted by the light source device is led to the lenses, wherein the light source device is arranged within the angular field of view of the first and second lenses, the angular field of view being set to a predetermined angle. The inter-lens distance and the angular field of view of the two lenses are set to a value based on the human engineering. A dot density to such a degree as to be capable of reproducing textural information can thus be obtained with a structure reduced in size to such a degree as to be mountable on the head, by taking the above-mentioned factors into consideration.

According to a further aspect of the present invention, in order to achieve the above-mentioned object, there is provided an information display apparatus comprising a light source device including a plurality of light sources, a first mirror for reflecting the light emitted from the light source device, and a second mirror for focusing the light emitted from the light source device by reflecting the light reflected on the first mirror according to a predetermined operation, wherein the light source device, the first mirror and the second mirror are arranged in such a position that the light emitted from the light source device intersects the focused light reflected from the second mirror.

More specifically, according to the invention, the second mirror is arranged horizontally with respect to an eye piece for visually recognizing the focused light, and the light source device is arranged between the eye piece and the second mirror below a horizontal line connecting the center of the eye piece and the center of the second mirror in such a manner that the light emitted from the light source device intersects the light reflected from the second mirror, and the first mirror is arranged between the eye piece and the second mirror above a horizontal line connecting the center of the eye piece and the center of the second mirror, thus reducing the size of the information display apparatus. The LED array, the rotary mirror and the fixed mirror are arranged in such a fashion as to secure a light-path length considered necessary to reproduce an appropriate image.

BRIEF DESCRIPTION OF THE DRAWINGS

FIGS. 4A, 4B and 4C are diagrams showing a light source device according to the invention.

FIG. 5 is a diagram showing the conditions for visually recognizing the light emitted by a light source device with the two eyes according to an embodiment of the invention.

DESCRIPTION OF THE PREFERRED EMBODIMENTS

The present invention is described in detail below with reference to the embodiments shown in the accompanying drawings. The goggle-type display as referred herein is defined as one in which an image (newspaper information) displayed is visually recognized with the two eyes.

Figure 1:
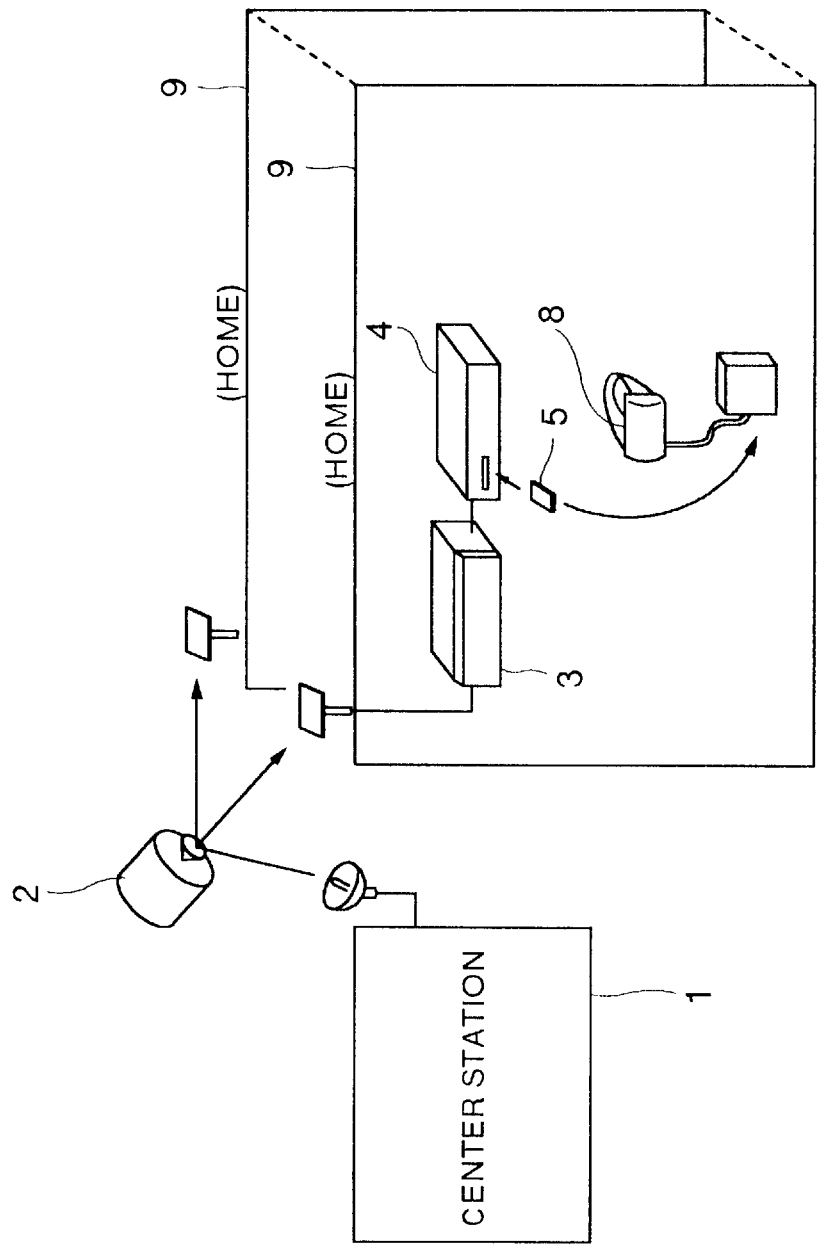
FIG. 1 is a diagram showing the manner in which the invention is applied according to an embodiment of the invention.

A form of information distribution system using the goggle-type display is shown in FIG. 1. A new information distribution system shown in FIG. 1 comprises a center station 1 constituting a distribution source of newspaper information having the function of accessing a communication satellite 2 which in turn has the function of distributing to various areas in a country the newspaper information transmitted from the center station 1, a remote station 9 constituting a destination of the newspaper information having the function of reproducing the newspaper information, and a goggle-type display 8 according to the invention having the function of reproducing the information recorded on a record medium 5 in virtual reality. The remote station 9 specifically includes a receiver 3 for receiving the newspaper information from the communication satellite 2 and a record unit 4 for record the received newspaper information in a record medium such as an optical disk or a memory. In this information distribution system, the image information on the newspaper distributed using a satellite link from a newspaper publishing company (center station 1) is recorded in the record medium 5 by the record unit 4 in each home (remote station 9) in various areas of the country, and the goggle-type display 8 is used for reproducing the image from the record medium 5, so that the newspaper information can be reproduced whenever necessary at any geographical points.

Figure 2:
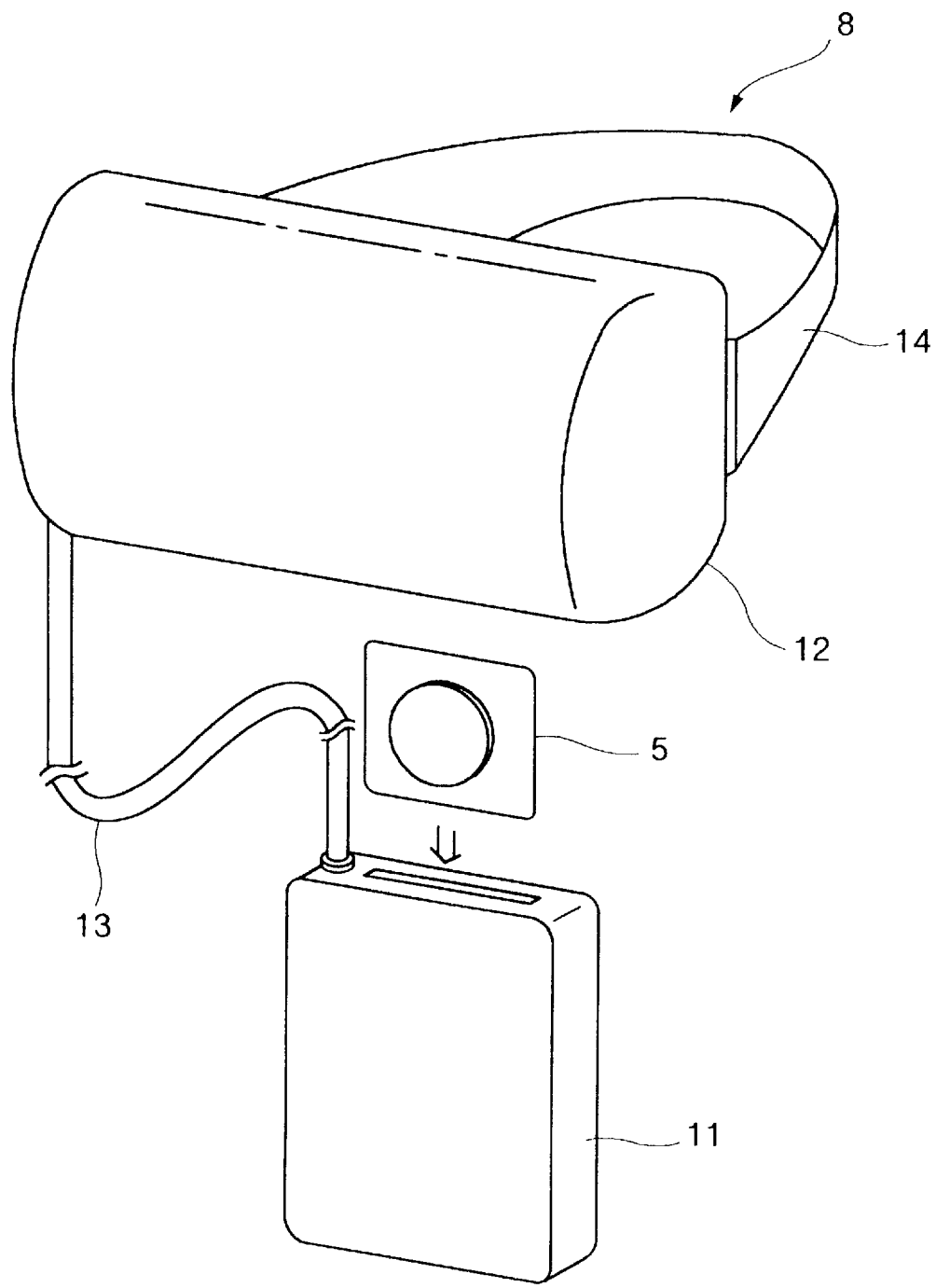
FIG. 2 is a diagram showing the external appearance of an embodiment of the invention.

The goggle-type display 8 according to the invention is shown in detail in FIG. 2. The goggle-type display 8 includes a terminal 11 for reading the newspaper information recorded in the record medium 5 and goggles 12 connected with a connecting cord 13 and having a head band 14 for reproducing the newspaper information by means of light sources such as LEDs. For example, in order to reproduce the information of a A2-size newspaper (a page of the newspaper), the terminal 12 reads each line of the information from the A2-size newspaper and transmits it to the goggles 12. In the process, in view of the need to transmit each line of information read from the terminal 11 within a limited time length, a serial data is converted into a parallel data and transmitted to the goggles 11. The goggles 11, on the other hand, reproduces the newspaper page by controlling the flicker of a plurality of light sources according to the data transmitted.

This display, which is capable of displaying the newspaper page, is applicable also to a document search system or the like. This display is further applicable to a high-dot density image display as well as to a system for viewing an image as an alternative to print-outs of a fax and a printer.

1. Goggles

Figure 3B:
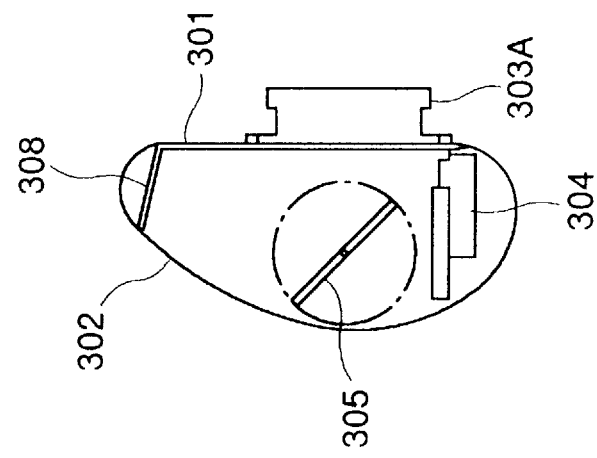
FIGS. 3A and 3B are diagrams showing the structure of goggles according to an embodiment of the invention.
Figure 3A:
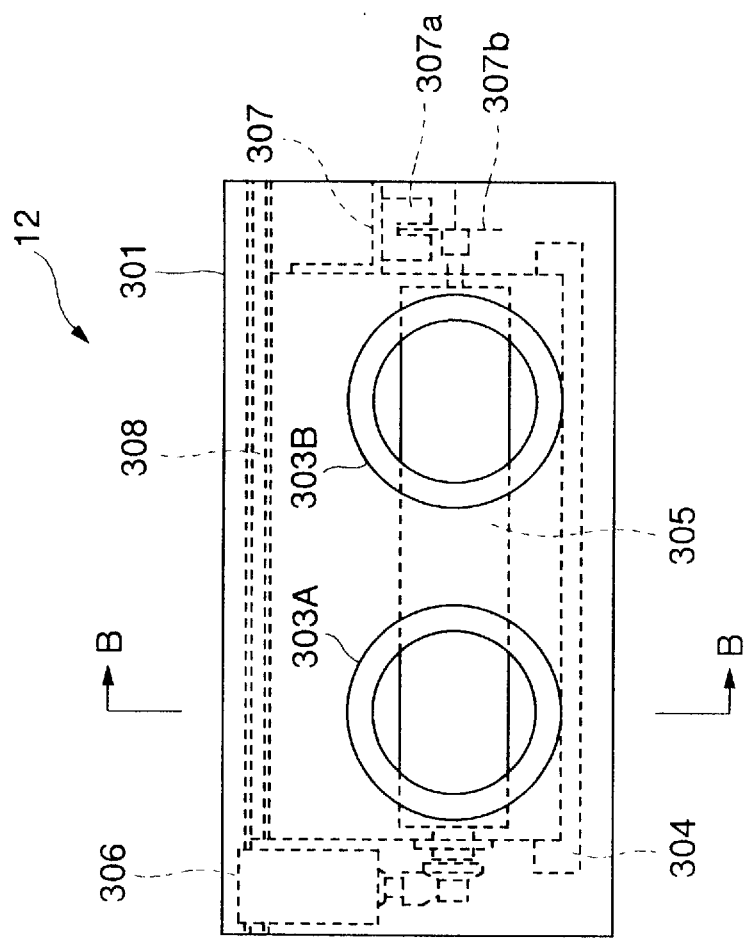

FIGS. 3A and 3B show the structure of the goggles 12. FIG. 3A is a front view of eye pieces 303, and FIG. 3B a sectional view taken in line B—B in FIG. 3A. In FIGS. 3A and 3B, the goggles 12 includes a housing 31, a cover 302, eye pieces 303A, 303B through which the viewer visually recognizes an image (newspaper information), a light source device 304 for emitting light according to the parallel-input newspaper information to be displayed, a fixed mirror 308 for reflecting the light emitted by the light source device 304, a rotary mirror 305 for scanning the light reflected from the fixed mirror 308 toward the eye pieces 303A, 303B, a driver 306 for rotating the rotary reflective 305, and a sensor 307 for searching for a screen to take synchronism with the newspaper information to be displayed. The screen search sensor 307 includes a shield plate 307a and a photo interrupter 307b. According to the embodiment under consideration, the fixed mirror 308 which is handled as a plane mirror may be replaced with a convex or a concave mirror with equal effect, whereby the light path length can be optically changed or the angle of view can be adjusted. Also, instead of the rotary mirror used in the embodiment, an oscillational mirror can be used with equal effect. Further, the fixed mirror and the rotary mirror may be arranged in reverse order.

The operations performed in the goggles 12 are as follows. First, the light source device 304 turns on the LEDs of the light source device 304 in accordance with the newspaper data (for each horizontal line) sequentially sent from the terminal 11. The light emitted from the light source device 304 is led to the rotary mirror 305 through the fixed mirror 308. The goggled 12 produces a two-dimensional image by rotating the rotary mirror 305 in order to secure a high-dot density of the image. Specifically, a two-dimensional image is produced in such a manner that the LEDs of the light source device 304 are turned on to admit the light to the eye pieces 303A, 303B during the rotation of the rotary mirror 305. This operation utilizes the after-image effect of human eyes and therefore must take into account the scanning period of the light source device 304 and the image synchronization for generating the same image for a predetermined length of time in the same manner as if a print is superimposed.

In order for the image to be generated on the screen top-down as viewed from the viewer, the direction of rotation must be clockwise in FIG. 6 as described later.

The scanning period is assumed to be between 30 Hz and 15 Hz. In the case where a two-side mirror is used as the rotary mirror 305, the rotational speed of the mirror can reduced to 15 Hz to 7.5 Hz (900 to 450 rpm), i.e., one half of the scanning rate. The time to display a screen is equal to the time required for the rotary mirror 305 to cover the range $\phi 1$ to $\phi 2$ (see FIG. 6) as described later out of the time required to make a half rotation (180 degrees).

A motor 306 is used as a driving mechanism for rotation. The rotational speed of the motor 306 driven by a predetermined power supply (not shown) is reduced by gears, and some degree of adjustment is possible by changing the current. In an alternative method, one half of the information on a single screen is displayed on one side of a two-side mirror and the remaining information on the other side thereof. Each half information may be displayed in vertically divided two portions of the screen or every other line like the interlace of TV picture.

For image synchronization, a pulse is generated from the screen search sensor 307 by rotation of the rotary mirror 305 in order to determine the timing of the starting point of image scanning. The pulse specifically is one generated when the light is interrupted when the shield plate 307a directly connected to the shaft of the rotary mirror 305 crosses the photo interrupter 307b. The image synchronization will be described in more detail with reference to the terminal later.

What should be noted about the goggles 12 is that the newspaper page is reproduced by the above-mentioned processing operation with a structure as small as 90 mm long by 160 mm wide by 40 mm deep. For this purpose, the goggles 12 includes the light source device 304, the fixed mirror 308 and the rotary mirror 305 arranged as an integrated system in such positions as to satisfy predetermined conditions (for the arrangement of the light source device and the optical system). The integrated system is defined as one in which the light source device 304, the fixed mirror 308 and the rotary mirror 305 are provided one each in an arrangement enabling the light from the light source device 304 to be visually recognized by the two eyes of the viewer.

As an example, the predetermined conditions for reproducing the newspaper page of A2 size by use of the goggles according to the invention will be explained.

1.1 Light source device

FIG. 4A is a diagram showing the light source device in detail, FIG. 4B a plan view and FIG. 4C a side view thereof. The light source device 304 in FIGS. 4A, 4B, 4C includes LEDs constituting a light source, and a plurality of connectors capable of parallel receipt of the newspaper information transmitted from the terminal 12. Specifically, the light source device 304 includes an array of 1792 LEDs (with a light source portion 114 mm long) linearly arranged. With this array of 1792 LEDs, the light source device 304 can produce the newspaper page data of A6 size with a dot density of 400 dpi=1792 dots (the number of LEDs)/4.48 inches (length of one side of A6-size paper). This goggle-type display 8 preferably is capable of reproducing the maximum newspaper page of A2 size with a dot density of 200 dpi, in which case the newspaper page data of A2 size is thinned out every other dot of laterally adjacent pixels and every other line of longitudinally adjacent pixels by the terminal 11. The user of this light source device can also secure a dot density of 200 dpi without any problem in reproducing the newspaper page of A4 size. A display unit having a dot density of 200 dpi or more can display each character (about 3 mm square) of a newspaper article with a square of at least 24 dots in side length, thereby satisfying the requirement of dot dot density not spoiling the textual information.

The length of the LED array, on the other hand, is 114 mm ($1792 \times 63.5$ $\mu$m) as determined from the number of light sources on the basis of A6 size. The LED size of 63.5 m can be considered the minimum for the existing products. A light source device of this length (with a total length of 134 mm including the contour), if employed, can be arranged within the range of average head width of 150 mm as seen by reference to "Handbook of Human Engineering Standard Numerics and Equations" edited by Katahiko Sato, thereby making it possible to design an optimum goggle-type display.

In other words, this goggle-type display 8 is optimized as a display unit by employing an LED array of 400 dpi (114 mm long) for the A2-size newspaper page data (3232 horizontal dots and 4736 vertical dots with an assumed dot density of 200 dpi) taking the average human head width into consideration.

A dot density of 600 dpi (42.3 $\mu$m) can be expected with the future development of LED manufacturing techniques, with an even further improved dot density realizable in subsequent years. The number of dots indicated above is therefore liable to be increased even more. For example, a 2048-dot LED array with 600 dpi has a light source length of 87 mm. This is smaller in size than the aforementioned embodiments and can be employed with the display according to the invention. In this case, the light path length described below can be changed according to the required angular field of view. The light source length can be reduced somewhat when the angular field of view is changed.

1.2 Arrangement of optical system 1.2.1 Light path length (introduction of goggles)

Now, with reference to FIG. 5, the conditions will be described for visually recognizing the light from the light source device 304 with the two eyes, or more specifically, for reproducing the newspaper page with a false image at a point 30 cm before the eyes in the same manner as when reading the newspaper.

In FIG. 5, the goggles 12 includes a light source device 304 having 1792 LEDs linearly arranged, two eye pieces 303A, 303B constituting magnification lenses having an angular field of view of 45 degrees and a diameter of about 30 mm (effective diameter of 26 mm), and prisms 501A, 501B provided for the eye pieces 303A, 303B respectively. The prism 501A and the eye piece 303A located at the lower right portion of FIG. 5 are not shown. The rotary mirror and the fixed mirror described above are not shown in FIG. 5. The center distance of 65 mm between the eye pieces 303A, 303B is employed as a central value as determined from the average value of 63.2 mm for male adults with a standard deviation of 3.6 mm by reference to the average eye spacing (inter-pupil distance) shown in "Handbook of Human Engineering Standard Numerics and Equations" edited by Katahiko Sato.

Description will be made about the light path length from the light source device 304 (LED array) to the eye pieces 303A, 303B for enabling the two eyes to visually recognize the light from the light source device 304.

The angular field of view of the eye pieces 303A, 303B is about 45 degrees as mentioned above. The light source device 304 therefore must be arranged within this angular field of view of the eye pieces. The angular field of view through the eye pieces is expressed by equation (1) as follows.

$$q = \theta_1 + \theta_2 \quad (1)$$
$$= \tan^{-1}\frac{\frac{l_{LED}}{2} - \frac{l_i}{2}}{L} + \tan^{-1}\frac{\frac{l_{LED}}{2} + \frac{l_i}{2}}{L}$$

From equation (1) above, assuming that the light path length from the light source device 304 to the eye pieces 303A, 303B is 126 mm excepting the eye piece portion, the angular field of view $\theta$ through the eye pieces is 46.4 degrees, which is substantially equal to the eye-piece angular field of view of 45 degrees. Also assuming that the user's pupils are distant by 5 mm from the end of the eye pieces, the angular field of view $\theta'$ through the eye pieces involved is given as 40.1 degrees from equation (2).

$$\theta' = \theta_1' + \theta_2' \quad (2)$$
$$= \tan^{-1}\frac{\frac{l_{LED}}{2} - \frac{l_i}{2}}{L + l_L} + \tan^{-1}\frac{\frac{l_{LED}}{2} + \frac{l_i}{2}}{L + l_L}$$

According to the embodiment under consideration, the light path length is assumed to be 126 mm. This is based on the assumption that the angle of view is about 45 degrees as viewed toward the light source device (LED array) from the end of the eye pieces and the angle of view is about 40 degrees as viewed toward the light source device (LED array) from the pupils through the eye pieces.

The relation between the light path length and the angle of view with the inter-eye piece distance of 65 mm is shown in Table 1.

TABLE 1

| Light path length (mm) | 120 | 125 | 130 | 135 | 140 | 145 | 150 | 155 | 126 |
|---|---|---|---|---|---|---|---|---|---|
| Angle of view (deg) | 48.3 | 46.7 | 45.2 | 43.8 | 42.5 | 41.3 | 40.0 | 29.0 | 46.4 |

Eye spacing: 65 mm

As seen from Table 1, assuming that the angle of view is about 40 degrees as viewed toward the light source device (LED array) from the pupils through the eye pieces, the minimum value of the light path length from the pupils is about 150 mm. The distance of 24 mm from the eye pieces to the pupils (including the thickness of 19 mm of the eye pieces) is subtracted from 150 mm, whereby the light path length of 126 mm from the end of the eye pieces to the light source device (LED array) is obtained. Table 1 also shows that the view angle requirement of about 45 degrees is thus satisfied for the particular light path length. The light path length according to the embodiment under consideration is thus determined.

The light path length of the display unit varies depending on the setting of angle of view, which is preferably about 40 to 45 degrees according to the embodiment.

The eye pieces 303A, 303B are provided also with prisms 501A, 501B for correcting the cross-eye angle. The cross-eye angle is defined as the angle formed by the line connecting the center P(1) of the eye piece 303A, the center 0(1) of the display unit 304 and the center Q(1) of the eye piece 303B. By adjusting this angle, the distance feel of an image reproduced on the goggles 12 can be adjusted. More specifically, the focal point of each eye can be corrected farther than the actual position through the individual eye pieces 303A, 303B. Even in this case, an attempt to make the two eyes view a single object causes the viewer to grasp the actual light path length of 126 mm. In spite of the fact that the focal point is corrected farther by the eye pieces, an unnatural feeling occurs to the human eyes since an object is grasped at a point with an actual light path length of 126 mm. To obviate this unnatural feeling, the cross-eye angle described above is required to be corrected. Let the eye spacing be 65 mm and the light path length 126 mm as shown in FIG. 5. The cross-eye angle according to the embodiment under consideration then is given as $\theta_3=14.5$ degrees from equation (3).

$$\theta_3 = \tan^{-1} \frac{\frac{l_i}{2}}{L} \quad (3)$$

The image visually recognized by the user is therefore located as near as about 126 mm. The image size involved is felt directly from the size 114 mm of the light source portion of the light source device. As a result, for an image to be formed at a point 30 cm away from the eyes (eye pieces), the cross-eye angle is required to be $2\theta'_3 = 12.4$ degrees from equation (4).

$$\theta_3' = \tan^{-1} \frac{\frac{l_i}{2}}{L'} \quad (4)$$

$(L' = 30 \text{ cm})$

With the goggle-type display 8 according to the invention, therefore, the cross-eye angle of the goggles 12 is accordingly corrected to 12.4 degrees by setting the scanning angle $\theta_4$ of the prisms 501A, 501B to 8.3 degrees from equation (5).

$$\theta_4 = \theta_3 - \theta_3' \quad (5)$$

Consequently, an image is reproduced at a point 30 cm away from the eyes is reproduced on the goggle-type display 8. This distance of 30 cm is considered as one desirable when the human reads a text.

Further, the goggles 12 may include an eye-spacing adjust knob (not shown) for accommodating the differences in eye interval among individual persons and a focus adjust knob (not shown) for correcting the variations in visual acuity among different viewers.

The goggle 12 according to an embodiment satisfying the conditions for the light path length, etc. described above is shown in FIG. 7. In the goggles 12, in order to secure the light path length, the light from the light source device 304 is led to the eye pieces 303A, 303B through the fixed mirror 308 and the rotary mirror 305.

1.2.2 Arrangement (size reduction)

The foregoing description concerns the case in which the newspaper information is caused to be visually recognized by securing a predetermined light path length in the goggle 12. Considering the portability required of the goggle-type display apparatus 8 according to the invention, however, it is preferable to further reduce the size of the goggles 12. The goggle-type display apparatus 8 reduced in size according to an embodiment is shown in FIG. 6. In this explanation, a diagram showing the human head as viewed from a side thereof is used, in which the optical system, the light path, etc. are two-dimensionally handled within this plane. According to the invention, the optically same principle is considered applicable to the structure along the direction perpendicular to the plane.

Figure 6:
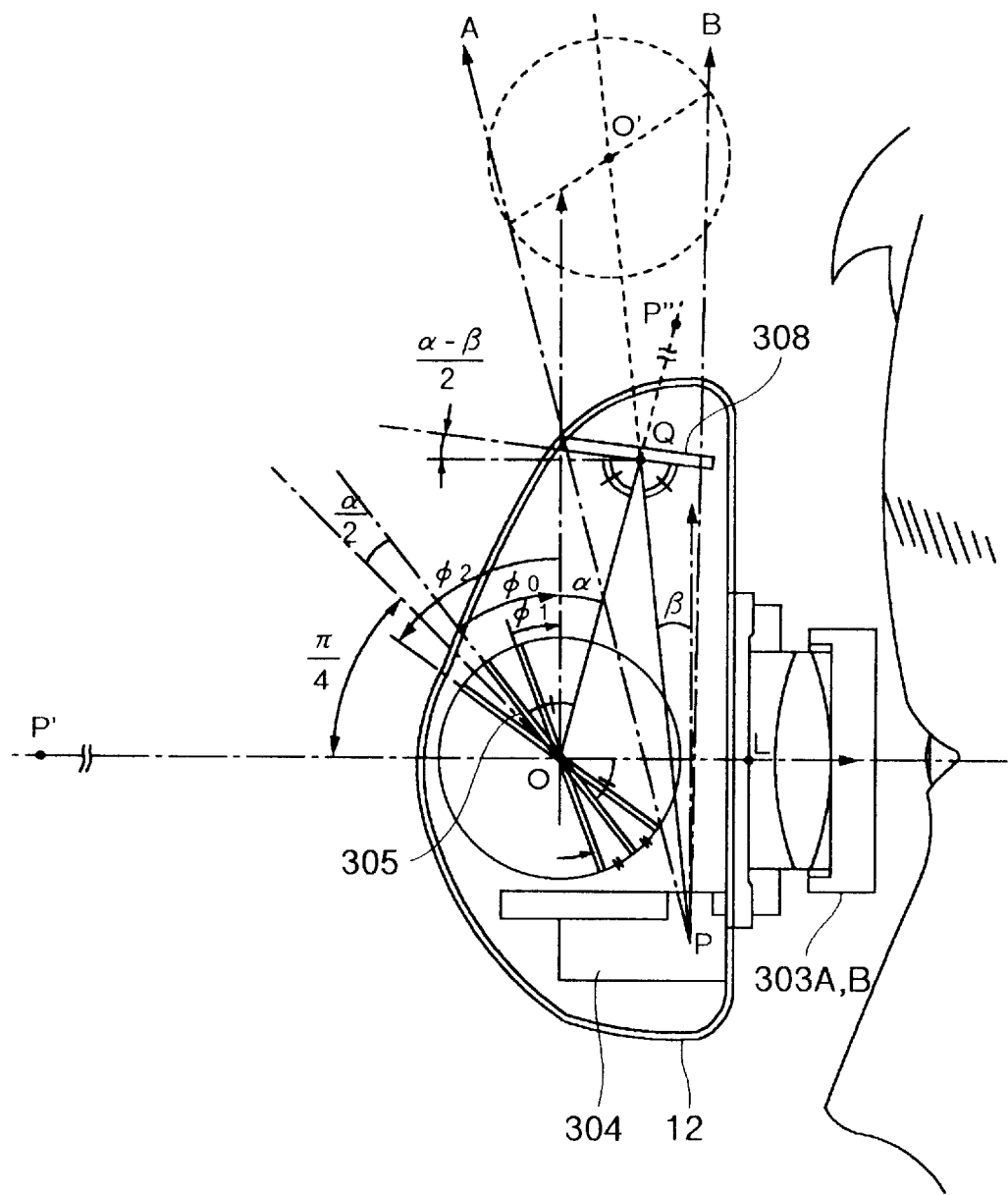
FIG. 6 shows the structure of goggles reduced in size according to an embodiment of the invention.
Figure 7:
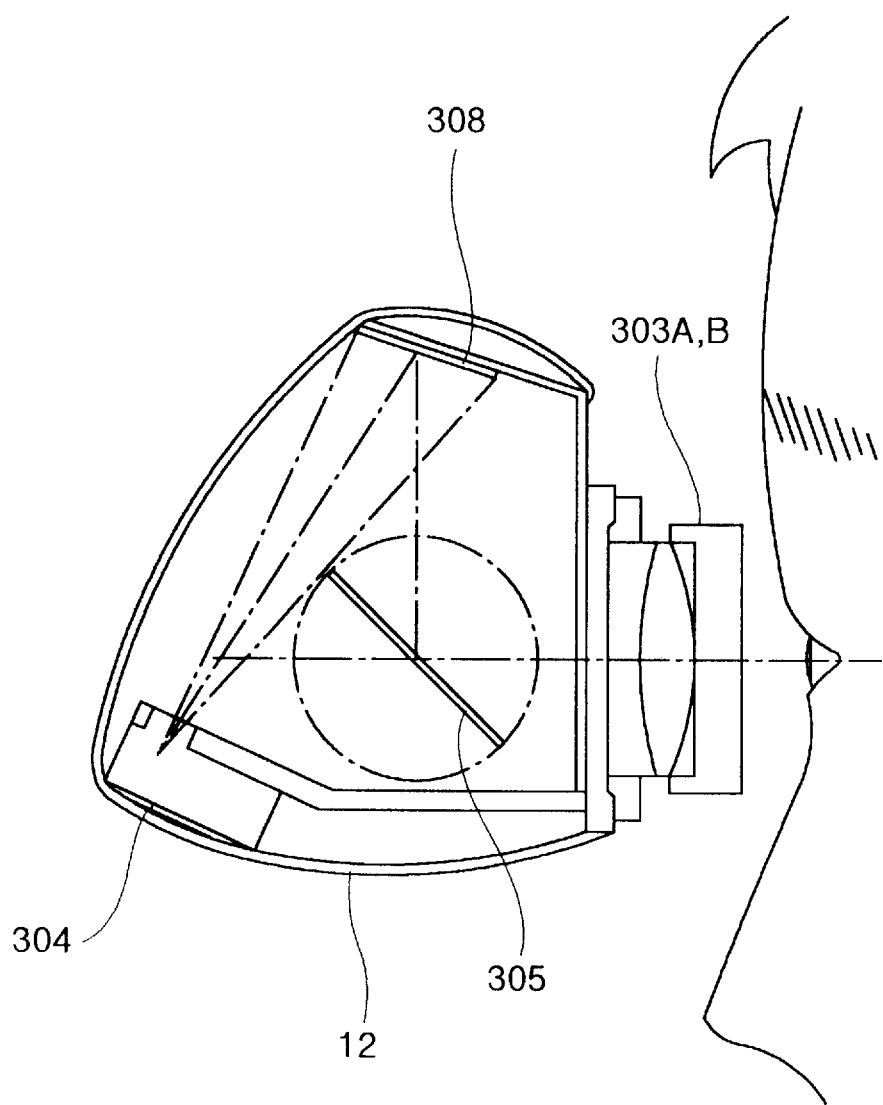
FIG. 7 shows the structure of goggles reduced in size according to another embodiment of the invention.

In FIG. 6, the goggles 12 includes, as in FIG. 7, a light source device 304 having a plurality of light sources, a fixed mirror 308 for reflecting the light emitted from the light source device 304, and a rotary mirror 305 for focusing the light from the light source device 304 by reflecting the light reflected from the fixed mirror by a predetermined operation. The most significant difference of these goggles from those of FIG. 7 is that the light source device 304, the fixed mirror 308 and the rotary mirror 305 are arranged in such a manner that the light emitted from the light source device 304 intersects the focused light reflected from the rotary mirror 305. More specifically, the rotary mirror 305 is arranged parallel to the eye pieces 303A, 303B for visually recognizing the focused light. Further, the light-emitting device 304 is arranged between the eye pieces 303A, 303B and the rotary mirror 305 below a horizontal line connecting the center of the eye pieces 303A, 303B and the center of the rotary mirror 305, and the fixed mirror 308 is arranged between the eye pieces 303A, 303B and the rotary mirror 305 above a horizontal line connecting the center of the eye pieces 303A, 303B and the center of the rotary mirror 305, in such a manner that the light emitted from the light source device 304 intersects the focused light reflected from the rotary mirror 305. The light path length mentioned above is secured by leading the light from the light source device 304 to the eye pieces 303A, 303B through the fixed mirror 308 and the rotary mirror 305.

Figure 8:
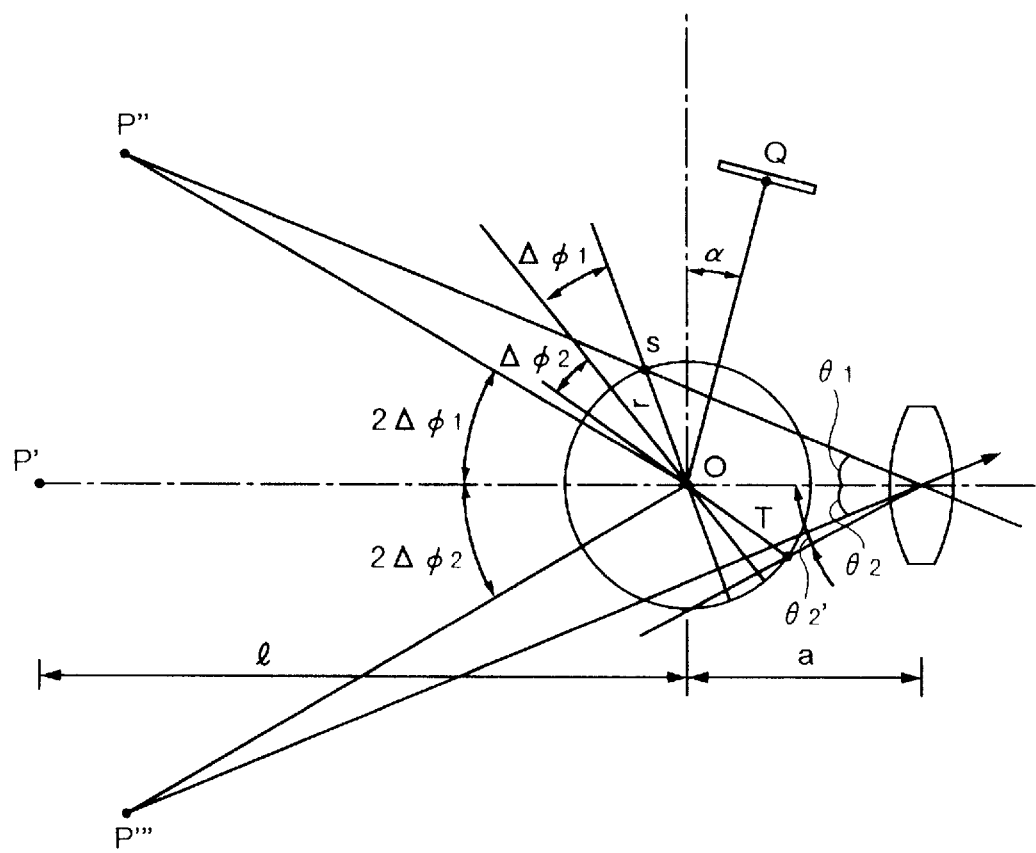
FIG. 8 is a diagram showing the design conditions for goggles reduced in size according to an embodiment of the invention.

The above-mentioned configuration will be described in detail with reference to FIGS. 6, 8 and 9.

(a) Relative positions of light source device 304, rotary mirror 305 and eye pieces 303A, 303B FIG. 6 shows the conditions for setting relative positions between the light source device 304, the rotary mirror 305 and the eye pieces 303A, 303B, or especially the location, mirror width and mirror inclination of the rotary mirror 305.

As shown in FIG. 6, a line connecting four elements including the light source P of the light source device 304, the center Q(2) of the fixed mirror, the rotational center O(2) of the rotary mirror and the optic axis of the eye pieces is assumed to be a nominal light path. The "nominal" is defined as indicating the center of scanning of light which is made by the rotary mirror. By way of explanation, assume that the position of an image visually recognized by the viewer through the eye pieces is P', the extension of the light path connecting the center of the fixed mirror 308 and the center of the rotary mirror 305 is P'', the angle formed by OP'' to the line perpendicular to the optic axis of the eye pieces 303A, 303B is α, and the angle formed by PQ to the line perpendicular to the optic axis of the eye pieces 303A, 303B is β.

In FIG. 6, in the case where the nominal angle φo of the rotary mirror 305 is π/4(=45 degrees), line segment OP'' is perpendicular to line segment OP'. When the rotary mirror 305 is raised a little (the rotary mirror 305 is rotated by α/2 clockwise in FIG. 6), P'' falls toward the eye pieces 303A, 303B, and the rotary mirror 305 assumes the nominal angle φo as expressed in equation (6).

$$\psi_o = \frac{\pi}{4} - \frac{\alpha}{2} \quad (6)$$

In this case, the angle formed between the fixed mirror 308 and the optic axis of the eye pieces, i.e., the inclination of the fixed mirror 308 is given as $(\alpha - \beta)/2$.

The width of the fixed mirror 308 is determined by the two straight lines connecting the mirror ends of the mirror image of the rotary mirror 305 generated by the fixed mirror 308 and the light source P of the light-emitting device 304. In other words, only the internal light between the two straight lines of all the light rays emitted from the light source P is reflected by the fixed mirror 308 and reaches the rotary mirror 305. This indicates that the width of the fixed mirror 308 more than the length defined by the two straight lines is useless in determining the width.

The linear light path PA on the rotary mirror 305 side of these straight lines of course is required not to be interrupted by the rotary mirror 305. In similar fashion, the light path PB on the eye pieces 303A, 303B side of the straight lines must not be interrupted by the surface of the housing (the surface where the eye pieces 303A, 303B are attached). As far as the light paths PA and PB are not so interrupted, the fixed mirror 308 desirably approaches the surface of the housing to which the eye pieces 303A, 303B are attached, whereby the whole housing can be reduced in thickness. The approach to the surface of the housing also can increase the angle α to such an extent as to assume a maximum value. Further, as seen from equation (6), the larger the angle α, the smaller the nominal angle φo of the rotary mirror 305, with the result that the mirror of the rotary mirror 305 is raised with an increased angle of view in longitudinal direction. In view of these facts, the position of the fixed mirror 308 can be moved by determining the nominal angle φo of the rotary mirror 305. In the process, the fixed mirror 308 is preferably located at a position increasing the angle α (where the nominal angle φo is reduced). This is by reason of the fact that the light can be reflected on the eye pieces 303A, 303B when the rotary mirror 305 is inclined almost in the direction perpendicular to the optic axes of the eye pieces 303A, 303B, within a range in which the light from the light source device 304 reaches the fixed mirror 308 without being interrupted by the eye pieces.

(b) Rotational angle of rotary mirror 305 and angle of view of two-dimensional image With the goggles 12, the direction of the light entering the eye pieces 303A, 303B from the rotary mirror 305 is inclined by rotating the rotary mirror 305, so that the light enters from a diagonally lower or a diagonally upper side into the viewer's eyes, thereby producing a two-dimensional image. In the case where the rotary mirror 305 is located within a certain range before and after the nominal angle φo, i.e., in a range capable of leading the light to the eye pieces, therefore, the light source device 304 is required to emit light. Also, the angle of view of the two-dimensional image as viewed by the viewer is twice as large as such an angle due to the specular reflection.

Now, description will be made about the case in which light is emitted from the light-emitting device 304 in the range of f1(=φo−Δφ1) to φ2(=φo+Δφ2) for the goggles with reference to FIGS. 8 and 9.

The angles of view φ1, φ2 of the two-dimensional image viewed by the viewer are determined from the relation of equation (7) (assuming that the rotary mirror 305 is sufficiently large).

$$\sin \theta_{1,2} = \frac{\sin 2\Delta\phi_{1,2}}{\sqrt{1 + \left(\frac{a}{l}\right)^2 + 2\left(\frac{a}{l}\right)\cos 2\Delta\phi_{1,2}}} \quad (7)$$

where $\Delta\phi_1 = \Delta\phi_2$ when $\phi_1 = \phi_2$.

The size of the rotary mirror 305 required to satisfy this relation can be obtained by determining $a/r_{1,2}$ from equation (8) where $r_{1,2}$ is the radius of gyration.

$$\tan \theta_1 = \frac{\cos \phi_1}{\frac{a}{r_1} + \sin \phi_1} \quad (8)$$

$$\tan \theta_2 = \frac{\cos \phi_2}{\frac{a}{r_2} + \sin \phi_2}$$

$$\phi_1 = \phi_0 - \Delta\phi_1$$
$$\phi_2 = \phi_0 + \Delta\phi_2$$

As far as a mirror is rotated, the mirror is assumed to have a side length twice as large as the larger length determined above. Hence, when $r_1$ is larger than $r_2$, a mirror having a radius $r_1$ of gyration has an angle larger than θ2.

The distance of the eye pieces 303A, 303B from the rotary mirror 305 provides a parameter. This value is desirably as small as possible on condition that the light along the line on the rotary mirror 305 side of the two lines connecting the light source of the light source device 304 and the ends of the mirrors of the mirror images due to the rotary mirror 305 or the fixed mirror 308 is not interrupted in the range of θ1(=θo−Δθ1) to θ2(=θo+Δθ2) in which the light source device 304 emits light. The light source device 304 is characterized by a linear form with small width along the longitudinal direction (6 mm according to the embodiment under consideration). Therefore, the distance between the rotary mirror 305 and the eye pieces 303A, 303B can be set to a very small value by placing the light source of the light source device 304 as near to the eye pieces 303A, 303B as possible.

(c) Technique for determining arrangement of optical system

The optical arrangement is determined according to the conditions described above. The technique for determination, however, involves the following iterative computations.

(0) Setting the required conditions

Field of view: The required values of view fields θ1, θ2 of the eye pieces 303A, 303B are set.

Light path length: Determined by the angular field of view of the eye pieces, etc.

Geometric arrangement: The position of the light source of the light source device 304, the position of the eye pieces 303A, 303B, the direction of the optic axis of the eye pieces 303A, 303B and the rotational center of the rotary mirror 305 are set on the same optic axis.

(1) Assumption

The radius of gyration and the nominal angle of the rotary mirror 305 and the distance between the rotational center of the rotary mirror 305 and the eye pieces 303A, 303B are assumed.

(2) Calculation

Fixed mirror 308: position, size, tilt angle

Rotary mirror 305: swing angle, angle of gyration (3) Decision

Decision is made as to whether light is interrupted, the presence of touches or whether sufficient miniaturization has been achieved.

(4) Feedback

The assumption in (1) or the required conditions in (0) is corrected based on the decision made in (3)

Now, a terminal for transmitting image data to the goggles will be described.

2. Terminal

A terminal 11 of the goggle-type display apparatus 8 shown in FIG. 2 will be explained.

The goggle-type display apparatus according to the embodiment under consideration employs an LED array of 1792 dots in order to reproduce the textual information with a dot density of 200 dpi. In the case where data is input to this LED array by 20-MHz clock which is considered a limit of a shift register, the mere shift time consumes as much time as 89.6 μs per line. The user thus cannot visually recognize the image projected on the goggle 13 as a still picture.

With the terminal 11, the shift time per line is reduced to about 5 μs (for the scanning time per screen of 10 ms and high-density image of about 2000 lines in vertical direction) by rearranging the image data as predetermined and transmitting a line of image data to the light source device 304 including the LED array in shared fashion. More specifically, 28 shift registers 501 configured of 64 bits per block are provided in the light source device 304, and the input to each shift register 501 is changed to 28 independent serial inputs. These 28 shift registers are shifted in parallel by 64 bits with a 20-MHz clock, whereby data transfer with a speed (3.2 $\mu s$) 28 times as fast as that conventionally achieved is made possible.

Data transfer with an even higher speed requires a further division of LEDs with a reduced number of bits to be shifted. This, however, involves an excessive number of input lines, with the need to increase the number of bits for the image memory circuit 406 outputting data, resulting in the problem of an increased circuit size. For these reasons, the terminal 11 according to the invention employs the division by 64 bits. As described above, LED division and parallel input can attain the image data transfer speed required for realizing a flickerless high-density image with high-speed scan.

Figure 9:
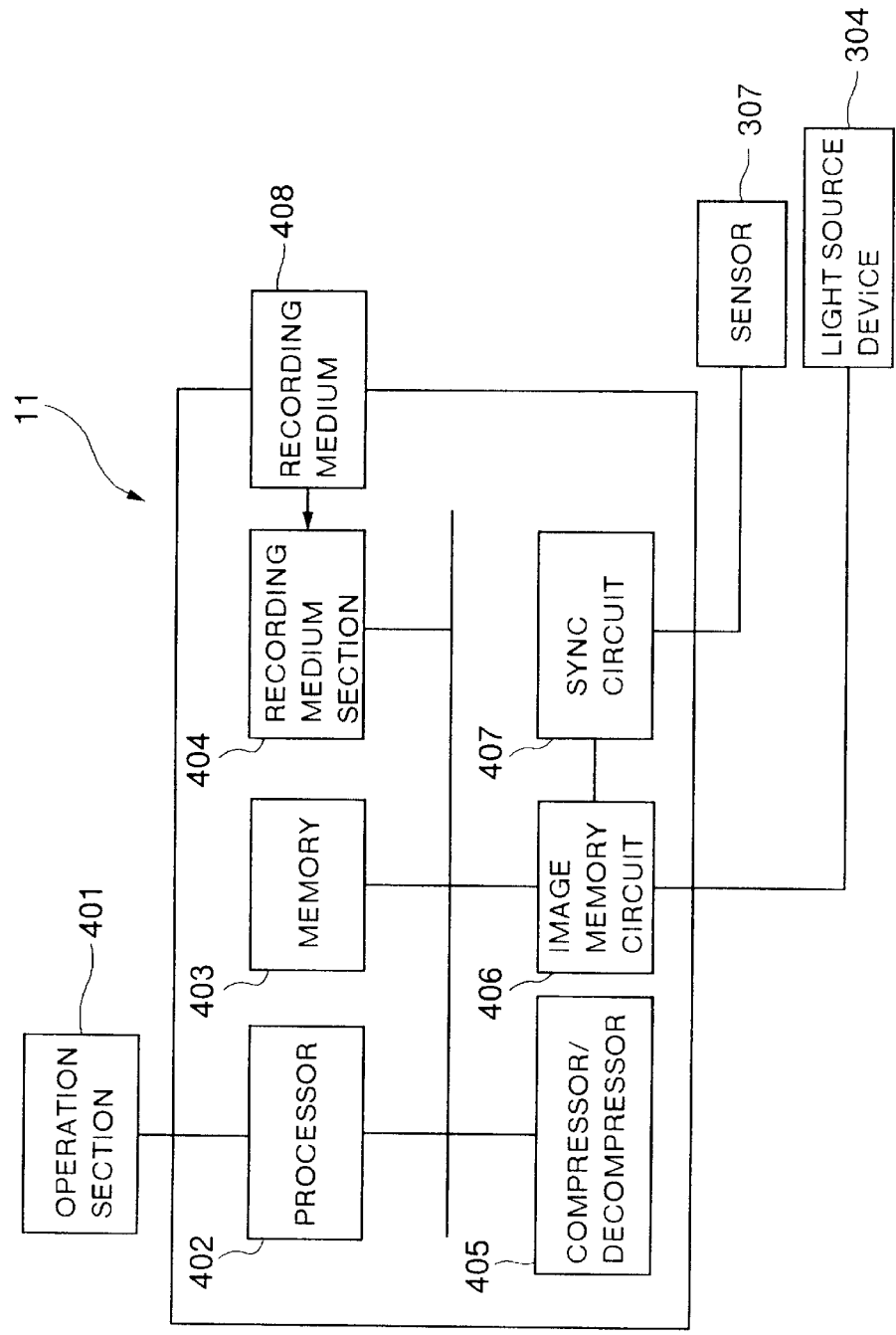
FIG. 9 is a block diagram showing the function of an apparatus according to an embodiment of the invention.

The configuration of the terminal 11 is shown in FIG. 9. The main component elements include an image memory circuit 406 for holding the image data on the newspaper page and outputting it to the light source device 304, a sync circuit 407 for securing screen synchronization, a record medium 404 for inputting image data to the terminal, a memory 403 for temporarily holding the image data input from the record medium 408, a compressor/decompressor 405 for compressing/decompressing the image data, a processor 402 for performing I/O operations and processing data at the terminal, and an operating section 401 for controlling the terminal operation (image enlargement/reduction and page change). More specifically, the memory 403 has the function of temporarily holding the A2-size image data of about 2M bytes per page at the terminal from the recording medium 408. This memory is also used as an area for image processing such as thinning process.

The compressor/decompressor 405 fetches and decompresses the compressed data from the record medium 408, and transfers the decompressed data to the memory 403. This compressor/decompressor 405 includes a dedicated LSI and a peripheral circuit.

The processor 402 controls the entire operations of the terminal, including data transfer to the image memory 406, fetching data from the record medium 408, control of the compressor/decompressor 405, and enlargement/reduction, page change, scrolling and like image processing operations on the display image. Each of these operations is executed by sending an interrupt signal to the processor 402 from the operating section 401.

In the case where the user wants to change the operation at the terminal, the operating section sends a command so that the processor 402 executes an appropriate program for state transition. Specifically, such image processing as page change, enlargement/reduction or scrolling of the image on display are performed.

The processing operation of the terminal 11 will be described in detail.

2.1 Data transfer to LEDs

Figure 10:
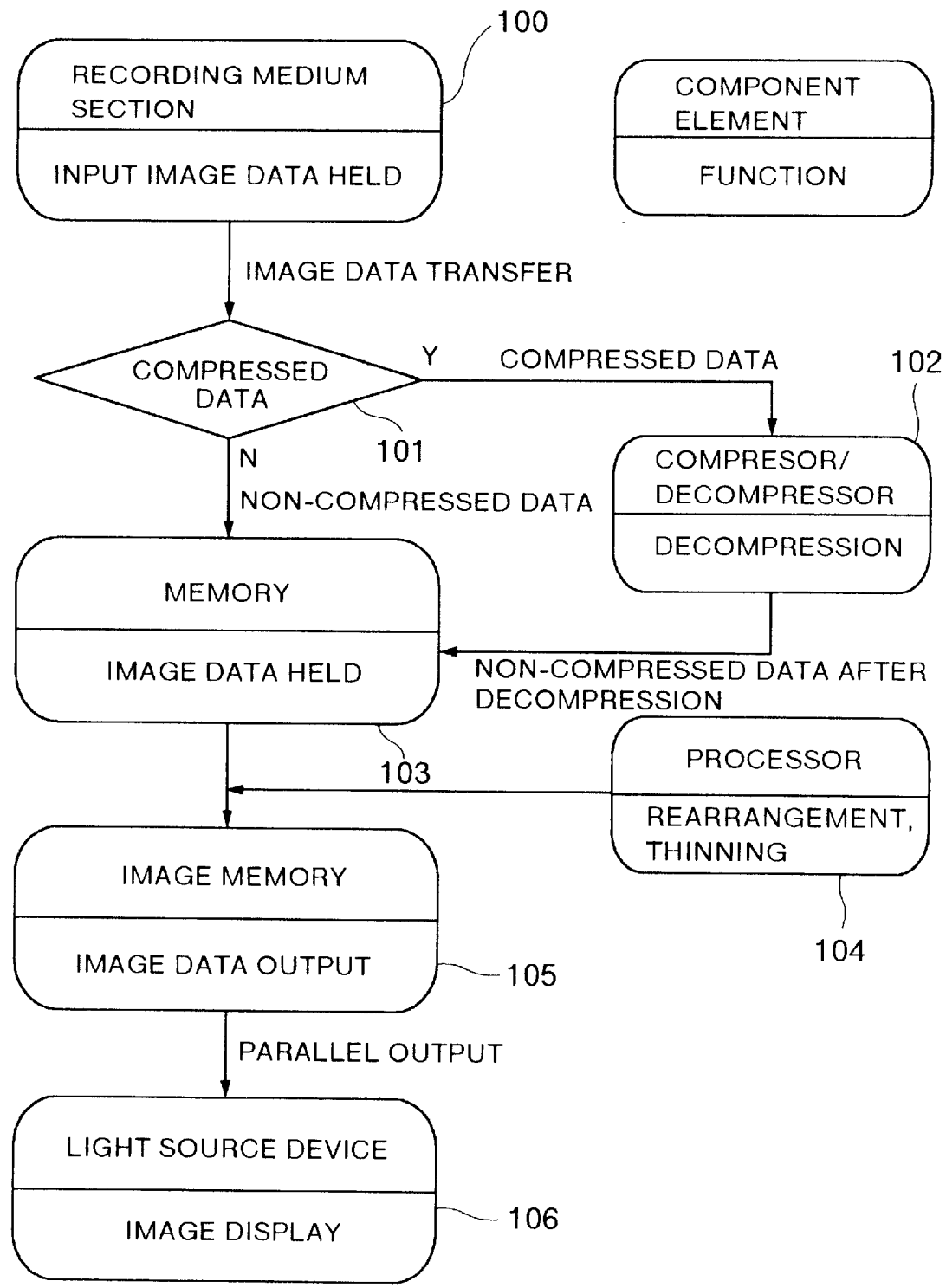
FIG. 10 is a flowchart showing the processes of an apparatus according to an embodiment of the invention.

The flow of operation at the terminal 11 will be described with reference to FIGS. 9 and 10.

First, the image data to be input to the terminal 11 is held in the record medium 408, which is inserted into a record medium section 404. The image data on the record medium 408 is, for example, the newspaper data. A page of newspaper data is bit image data of 3,232×4,736 bits (arranged with 200 dpi for A2 size, and with 400 dpi for A4 size). The data is held in compressed form for a record medium small in capacity compared with the total data quantity (step 100). Next, decision is made as to whether the image data held on the record medium 408 is compressed data or not (step 101). In the case of compressed data, the data is transferred to the compressor/decompressor 405 where it is decompressed (step 102). With uncompressed data, on the other hand, the data is transferred to the next step directly from the record medium 408. As a result, the image data recorded on the record medium becomes decompressed data (original bit image data), which is transferred to and held in the memory 403 (step 103). The bit image data held in the memory 403 is then rearranged by the processor 402 (step 104), and transferred to the image memory circuit 406. The rearrangement is defined, as shown in FIG. 11, as the step in which a one-line data of the original image is split into 64-bit blocks in horizontal direction, and the data in each of the blocks (blocks 1 to 28) is rearranged in the direction of address mapped to 1 to 28 bits respectively of the image memory 410 (which will be described in detail later) of the image memory circuit 406.

Figure 11:
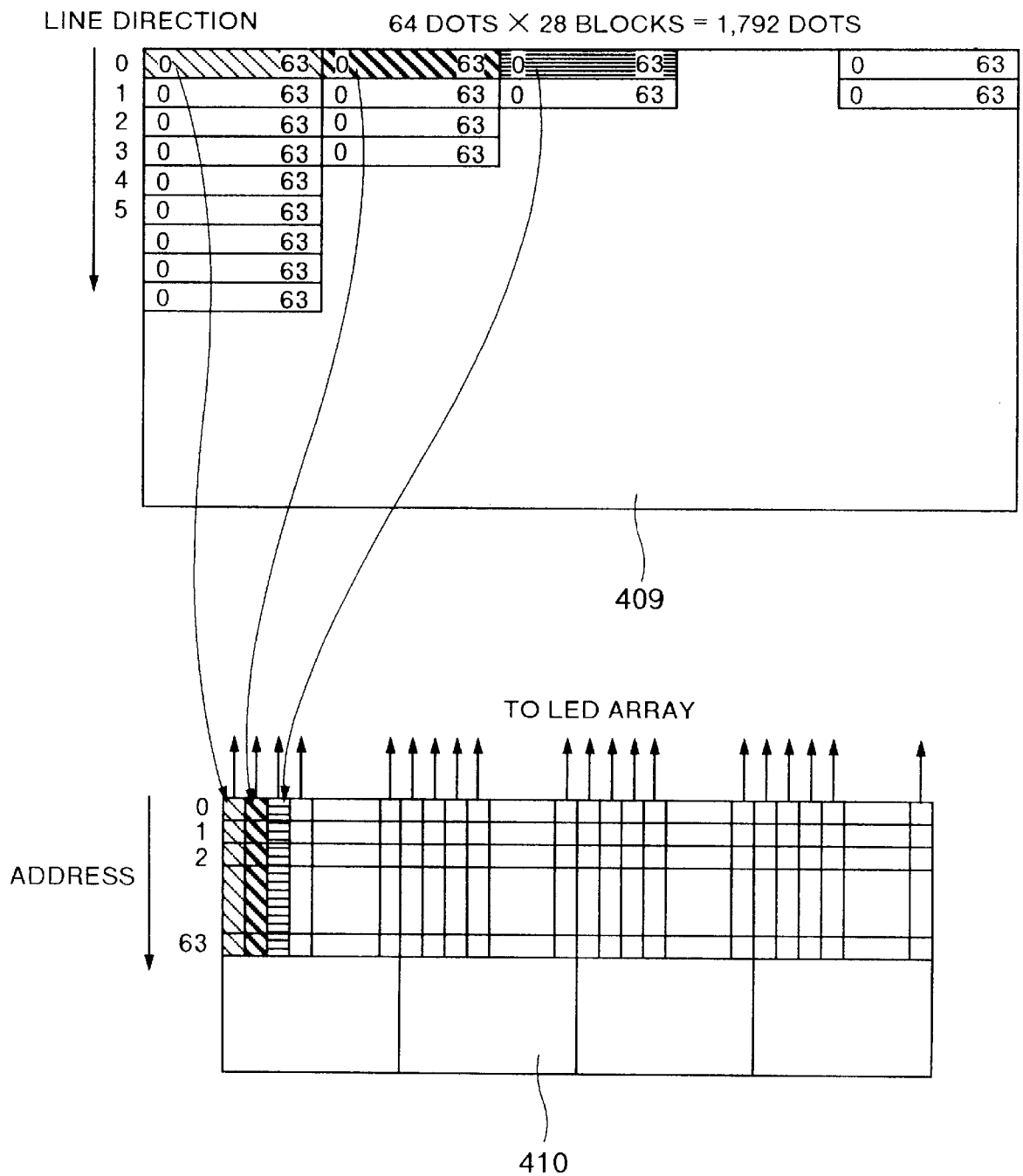
FIG. 11 is a diagram showing the relationship between the arrangement and output of an image memory for image data according to an embodiment of the invention.

This rearrangement step, as shown in FIG. 11, outputs 64-bit image data from each bit of the image memory 410 in accordance with the address (step 105), which image data are applied to each block corresponding to the LED array of the light source device 304, thereby reproducing each line of original image (step 106). A series of processings including the rearrangement is executed for each horizontal line of the image data of the original image, and the data thus rearranged are sequentially arranged in the image memory 410, thereby realizing the reproduction and display of a high-density image.

In step 104, a reduced image can be displayed making it possible to display a page of newspaper data. Specifically, contiguous two bits of data of the original 3,232×4,736 bits are ANDed, and in the case where either of the two bits is black (1), the associated data is set to 1. In this way, the data are thinned out along rows and columns. The data thus reduced in one half (1,616×2,368) is transferred to the image memory 410. Selection of an enlarged/reduced image (display switching) is realized by depressing an enlargement/reduction button (not shown) of the operating section 401 and thereby transmitting an appropriate signal to the processor 402.

2.2 Processing at image memory circuit 406

Figure 12:
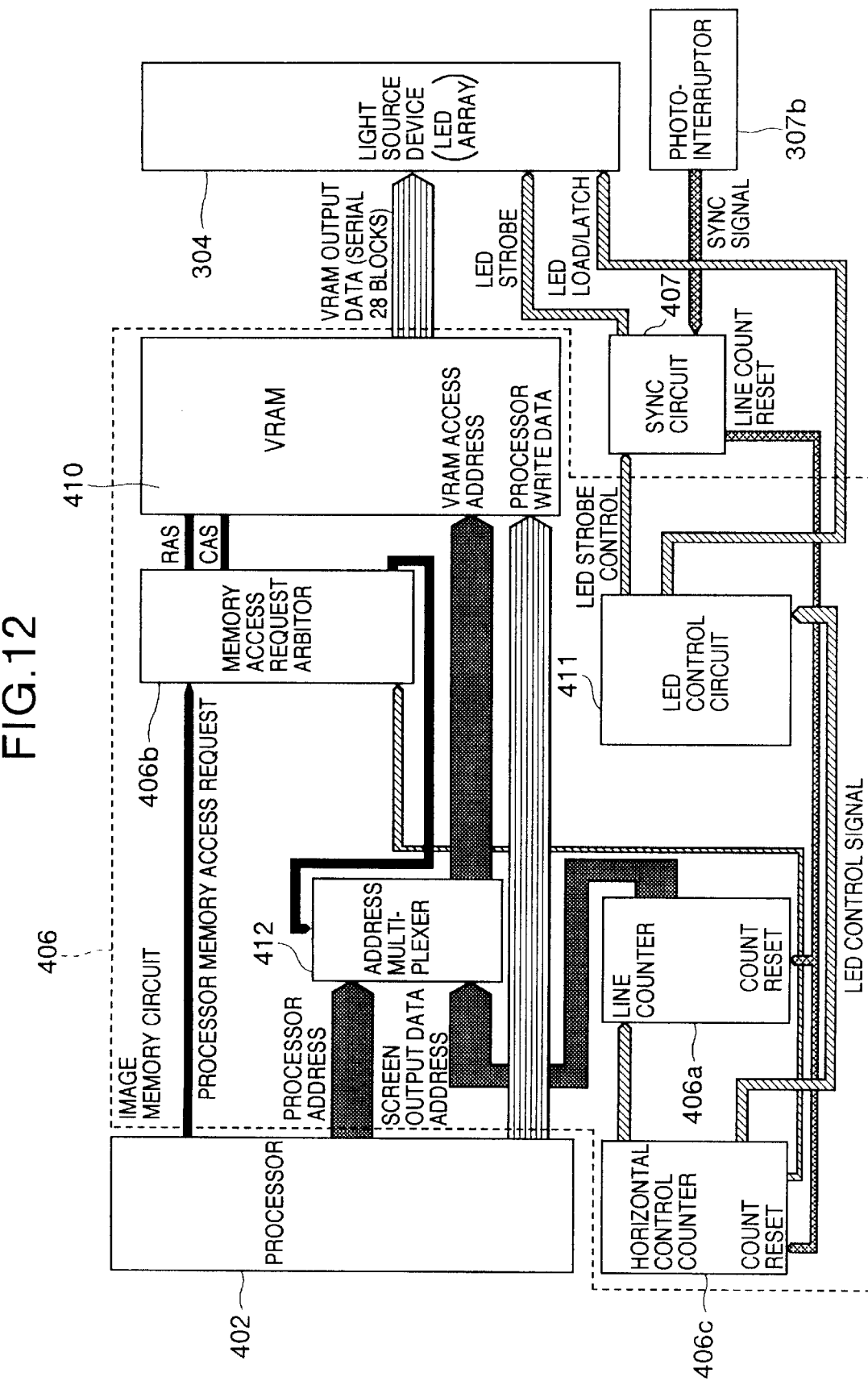
FIG. 12 is a block diagram showing an image memory circuit according to an embodiment of the invention.
Figure 13:
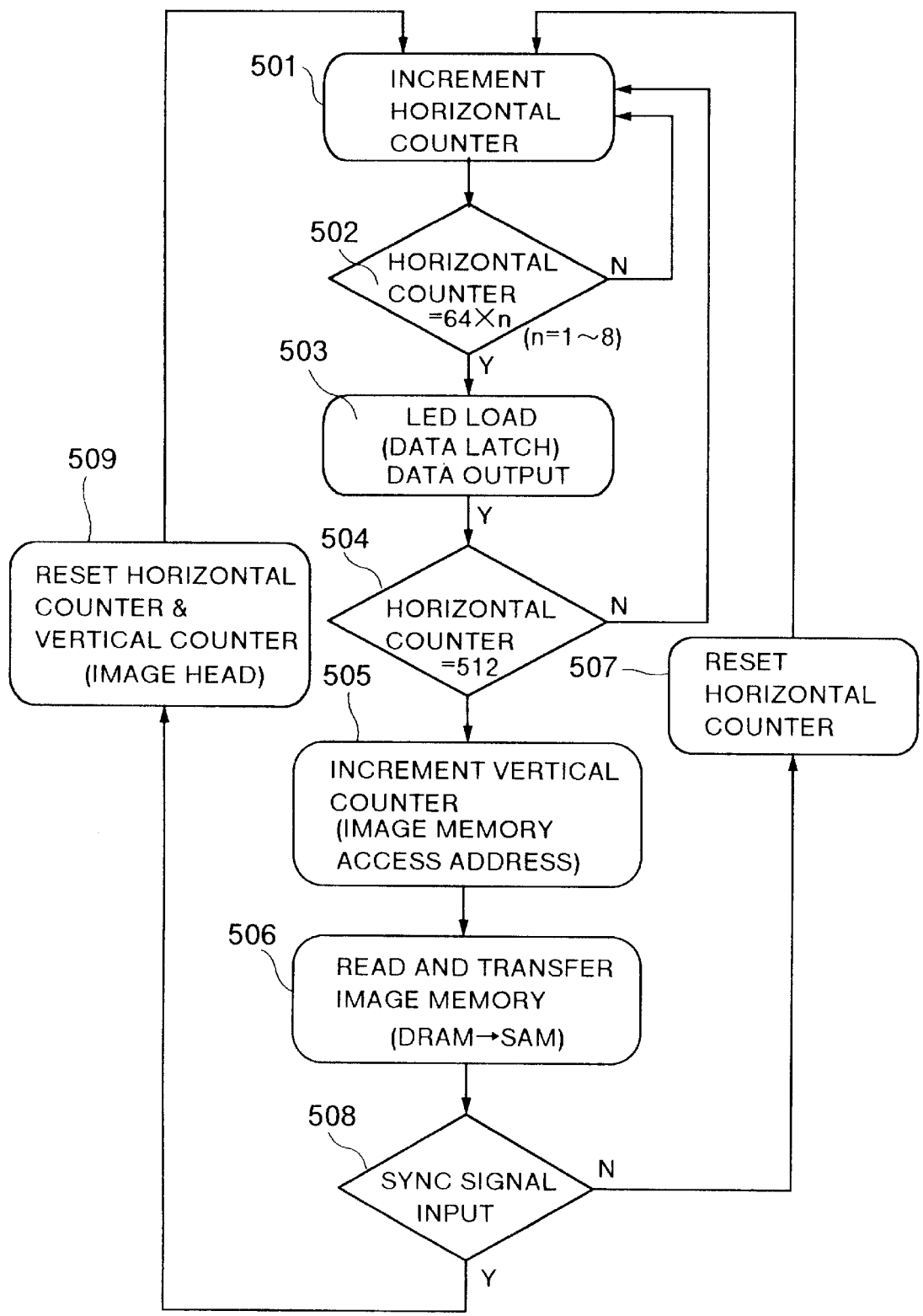
FIG. 13 is a flowchart showing the processes performed in an image memory circuit according to an embodiment of the invention.

Description will be made about the image memory circuit 406 constituting an image data transmitter to the light source device 304 from the terminal 11. FIGS. 12 and 13 show the configuration and the processing operation, respectively, of the image memory circuit 406.

In FIG. 12, the image memory circuit 406 includes an image memory 410 for holding the image data rearranged, a memory access request arbitor 406b for requesting the switching between write into/output from the memory 410, an address multiplexer 412 for switching the image data write address/output address for the image memory 410 in accordance with the signal from the memory access request arbitor 406b, a horizontal image control counter 406c for counting the column components of each line constituting the image to be reproduced, a screen counter 406c for counting the row components of the image to be reproduced, and an LED control circuit for transmitting a signal such as a latch and a strobe signal to the light source device 304. According to the embodiment under consideration, a VRAM (video RAM) having serial I/O ports is employed as the image memory 410. The image memory 410 thus employed includes a DRAM (dynamic RAM) and a register capable of holding a row of data of the DRAM. The register includes serial ports permitting multiple input and transfer (parallel processing) of serial data. The image memory 410 is capable of holding image data of 2048×4096 dots=about 1M bytes. According to the embodiment under consideration, 28 bits of the 32-bit bandwidth of the output data bus of the VRAM is assigned to the output port to the LED array. Consequently, the image memory 410 holds 2,048×4,096 bits out of 3,232×4,736 bits of bit image data covering a page of newspaper (with a density of 200 dpi for A2 size, and 400 dpi for A4 size) in one-to-one correspondence between pixel dots and bits. It follows therefore that an actually effective image data is composed of 1,792×4,096 bits.

A feature of the image memory circuit shown in FIG. 12 is that a processor peripheral circuit for making access from the processor 402 is constructed independently of a serial output peripheral circuit for serial output.

The processor peripheral circuit is a circuit for writing the image data sequentially sent from the processor 402 into the image memory 410, and includes a memory access request arbitor 406b providing a RAS (row address strobe)/CAS (column address strobe) timing circuit and an address multiplexer circuit.

More specifically, image data which may be sent from the processor 402 is sent and written into the image memory 410 with an address corresponding to the particular image data through the memory access request arbitor 406b. In the process, the address multiplexer circuit 412 causes the image memory 410 to recognize that the address applied thereto is for a write operation.

The serial output peripheral circuit, on the other hand, is defined as a circuit for outputting the image data written in the image memory 410 to the LED array constituting a light source device.

Specifically, in the case where the image memory 410 performs serial output, a row of data is serially output in accordance with a column address among the row and column addresses applied to the image memory 410 in time division. As a consequence, the serial output peripheral circuit sets the column address always to zero (no column address is input to the image memory), and only a row address is applied by the screen line counter 406a. The image memory 410 thus outputs a row of data in the order of column addresses simply upon application thereto of an arbitrary row address from the address multiplexer circuit 412. Upon complete output of a row of data, the screen horizontal control counter 406c instructs the memory access request arbitor to output a row of the next data.

In order to prevent collision between the image memory accesses by the two independent peripheral circuits, the two peripheral circuits are connected by the arbitor circuit 406b, and the address bus is temporally shared through a data selector for output. The access by the processor 402 and the access for data output are executed in mutual exclusion.

An output processing flow of the image memory circuit 406 is shown in FIG. 13.

Description is started with the state immediately after the screen horizontal control counter (base-512 counter) 406c and the screen line counter (base-512) 406a are reset in response to input of a sync signal sent from the sync circuit 407.

The screen horizontal control counter (hereinafter referred to as the horizontal counter) is activated for incrementation in accordance with the data output clock frequency of the image memory 410 (step 501). More specifically, the horizontal counter is activated for incrementation in response to the output of bit data from the image memory 410. Since each serial port sends 64-dot signals the LEDs to form each line of the display screen, the horizontal counter continues incrementing until a multiple of 64 is reached (step 502). In the case where step 502 shows that the horizontal counter has come to assume a value equal to a multiple of 64, the horizontal counter 406c sends a data load signal to the LEDs through the LED control circuit 411 (step 503). This processing completes the output of a line of data. In similar fashion, the processing on the second and subsequent lines is performed.

When the count on the horizontal counter 406c reaches 512 (step 504), the count on the screen line counter 406a (hereinafter referred to as the vertical counter) is incremented to advance the access address of the image memory by one (step 505). The reason for this processing is that the image memory 410 according to the embodiment under consideration produces an output through the serial access port (SAM) of address 512 along the columns, and therefore the output for each 64 bits requires addition of a row address after 8-line display and transfer of the data of the next row address to a serial access port register (step 506). Upon completion of the image memory read transfer (from DRAM to SAM), the horizontal counter is reset (step 507).

When a sync signal is applied from the sync circuit 407 (step 508), on the other hand, the sync signal resets the horizontal counter and the vertical counter (step 509), followed by the process returning to step 501 for performing similar processings.

The operations of steps 501 to 509 are repeated to output the same image data to the LEDs of the light source device 304 in accordance with the revolutions of the rotary mirror.

2.3 Processing operation at light source device 304

Figure 14:
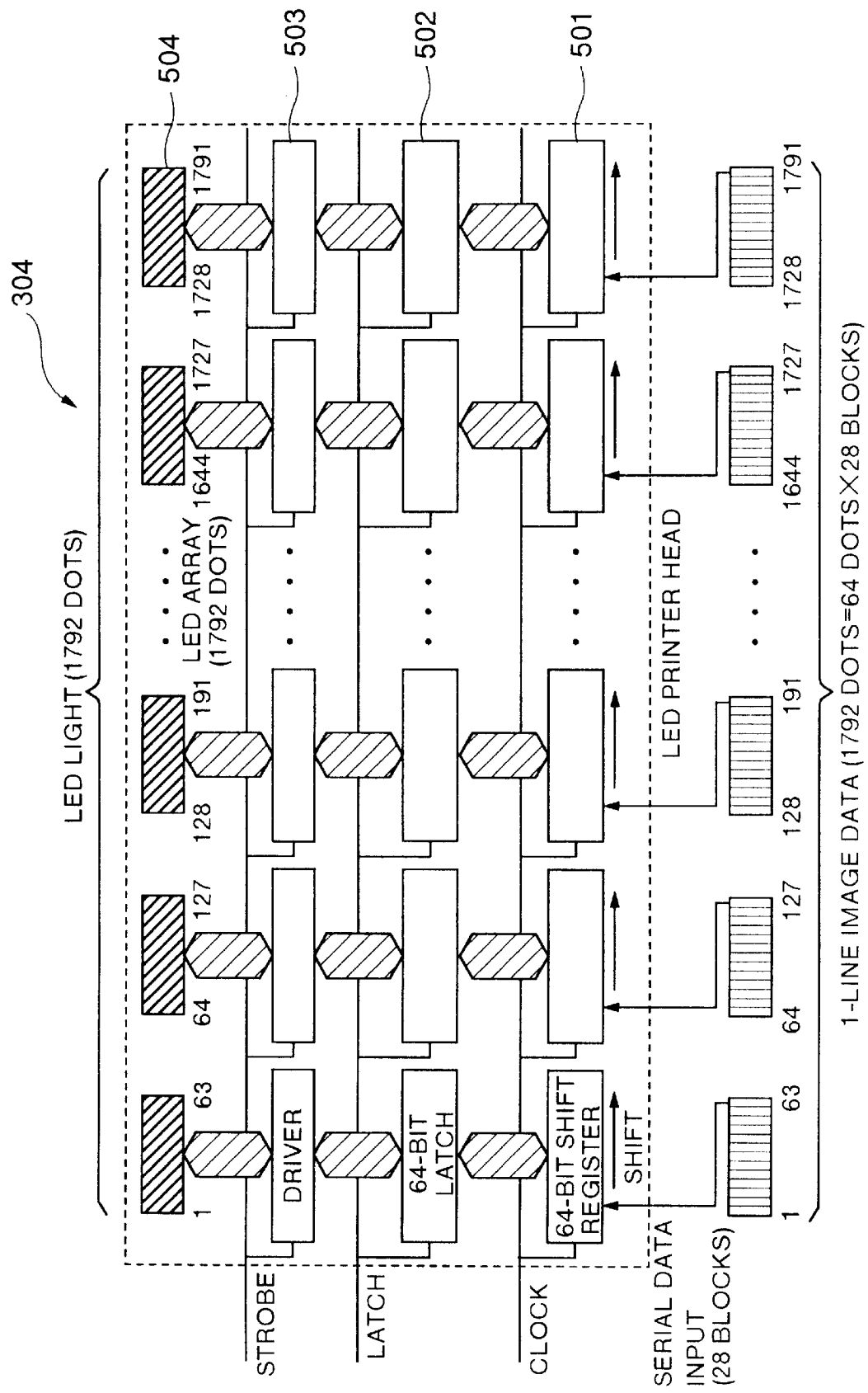
FIG. 14 is a diagram showing data input to an LED printer head according to an embodiment of the invention.

The processing operation of the light source device 304 will be described with reference to FIG. 14.

The light source device 304 applies 28 rearranged image data from the image memory circuit 406 to 28 shift registers 501 having an LED array constituting the light source device 304. Upon application of a line (1792 dots) of data to the shift register 501, the bit output of each shift register 501 is latched in a latch 502. The data latched in each latch 502 is sent to an LED driver 504 by means of a strobe signal, and the LED driver 504 illuminates the LEDs in accordance with the data thus sent. The strobe signal is defined as a signal for controlling the light-emitting operation of the LED array. In the case where no strobe signal is generated, the LED array does not emit any light regardless of the presence or absence of data. Wasteful light emission by the LEDs is thus prevented for an improved power consumption.

2.4 Processing operation of sync circuit

Figure 15:
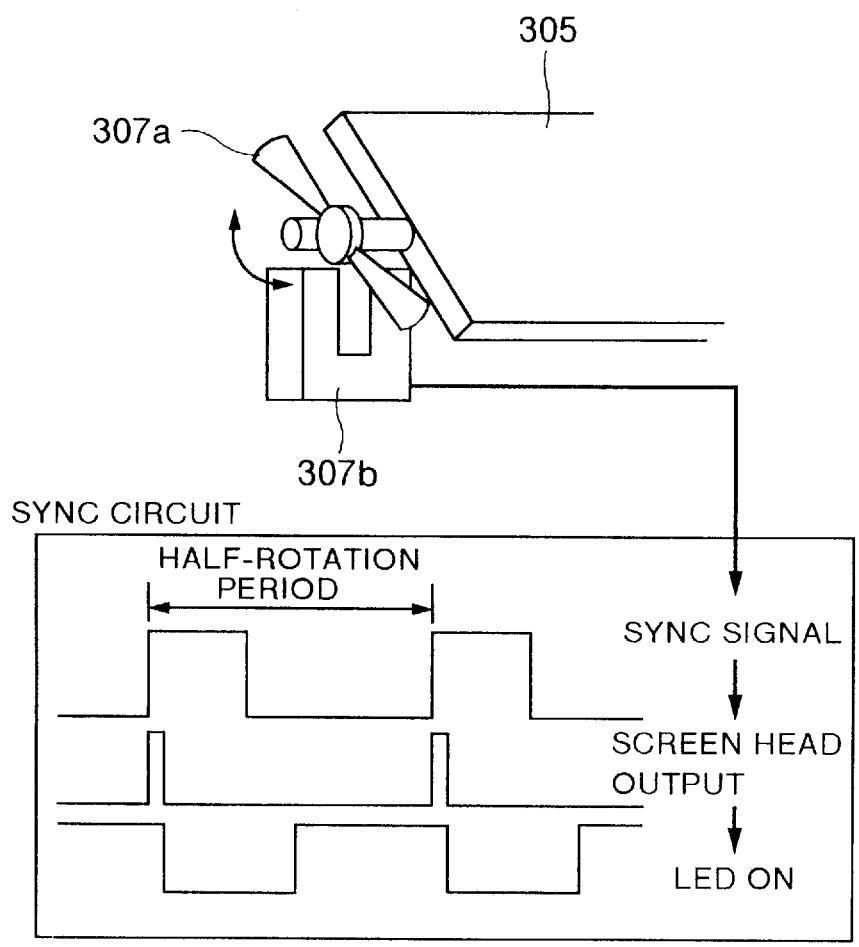
FIG. 15 is a diagram showing the principle of synchronization according to an embodiment of the invention.

The principle of operation of the sync circuit is described with reference to FIG. 15. If a stationary high-density image is to be realized, the output of the image memory circuit 406 (LED lit) is required to be synchronized with the rotation period of the rotary mirror 305. More specifically, an output timing of the image data must be obtained in such a way that always the same data is output for a given displacement angle of the rotary mirror 305. In order to achieve this object, a sensor 307 is mounted on the rotative shaft of the rotary mirror 305 of the goggle for detecting and outputting a signal indicating that the rotative shaft has reached a certain displacement angle, and a sync circuit 407 is built in the terminal for producing a timing signal for starting image output in response to a signal from the sensor 307. According to the embodiment under consideration, the sensor 307 is constituted by a photo-interruptor 307b. The photo-interruptor 307b includes an LED and a photo-coupler and outputs a signal when the light from the LED is interrupted by an object between slits. A shield plate 307a, which is mounted on the rotative shaft of a second mirror 305, is adapted to pass the slits of the photo-interruptor 307b, thereby generating a sync signal.

Figure 16A:
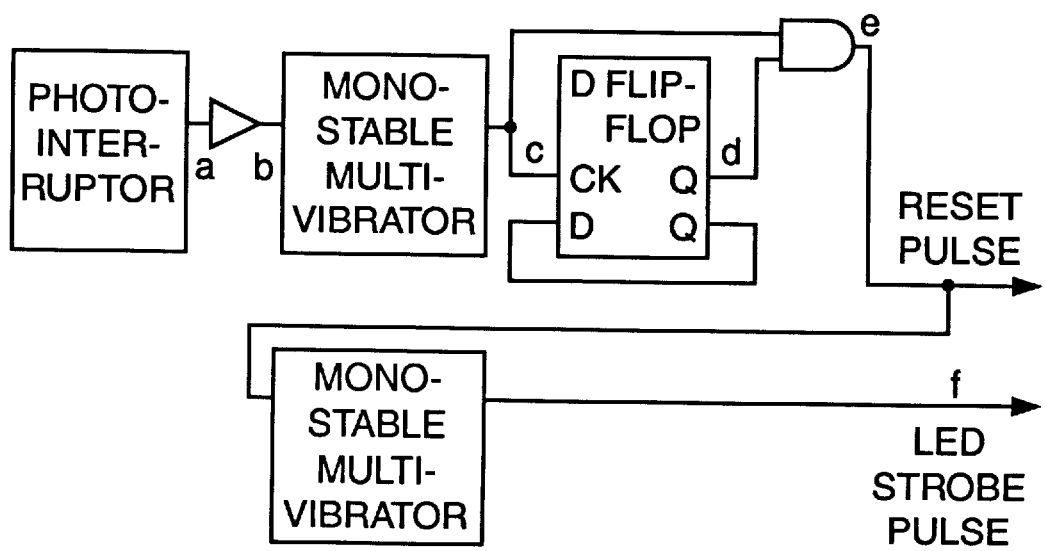
FIGS. 16A and 16B is a timing diagram and a block diagram of a sync circuit according to an embodiment of the invention.
Figure 16B:
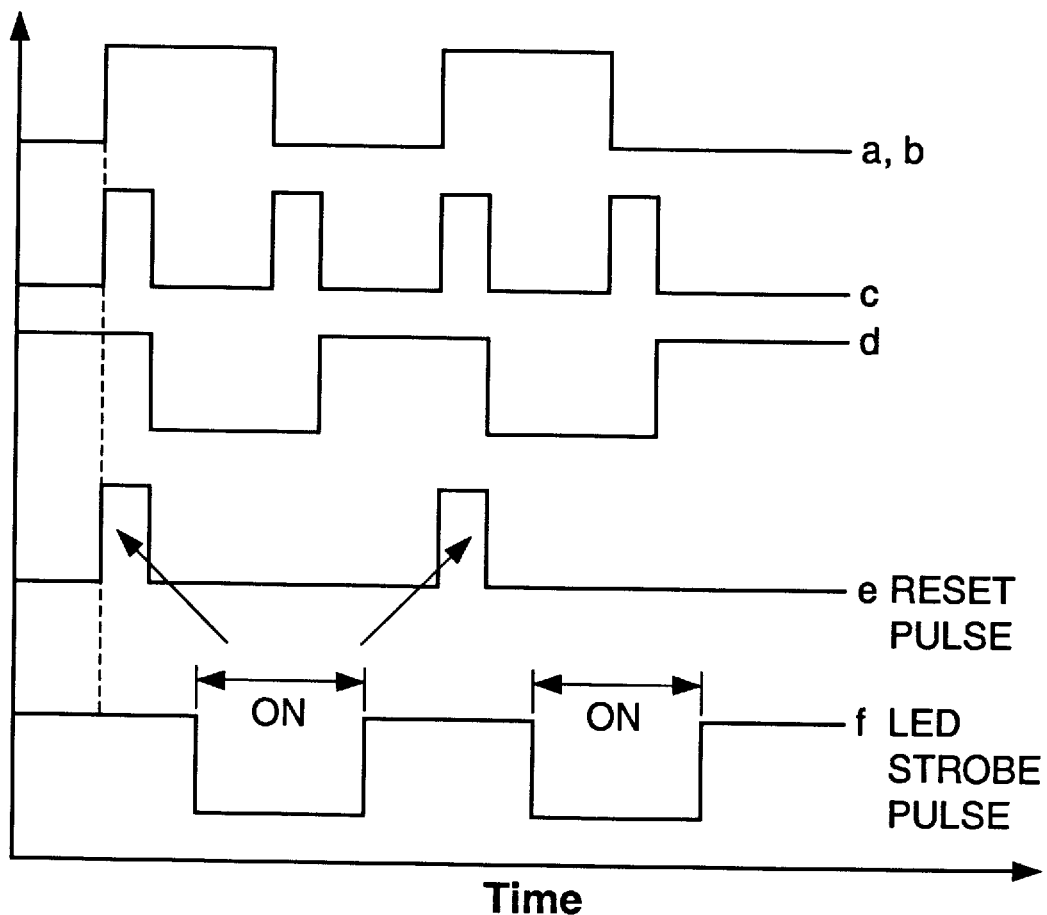

Now, the operation of the sync circuit 407 according to the embodiment under consideration will be described with reference to FIG. 16. The sync signal from the sensor 307 is applied to the sync circuit 407. The base-512 counter for setting the row address of the output from the image memory 410 is reset using the sync signal. As a result of this operation, when the displacement angle of the rotary mirror 305 reaches a certain angle (position), the head (first line) of the image is always output. Since the transfer speed and the rotational speed of the image data are constant, the same image is always displayed from the first line of the image, thereby realizing the synchronization.

Also, the timing for outputting the head of the image can be finely adjusted by varying the relative time intervals between the sync signal from the sensor 307 and the reset pulse applied to the counter. Consequently, the display image can be moved vertically. According to the embodiment under consideration, a pulse length varying circuit is implemented by a multivibrator.

Further, since the rotary mirror 305 is in rotational motion, the LEDs 304 are required to be off at the upper and lower parts of the image. For this to be realized, a strobe signal for the LED 304 having a width equivalent to the on-time is generated and the LEDs 304 are thus turned on in synchronism with the screen reset pulse. According to the embodiment, the length of this on-pulse is made also variable, whereby the screen display range can be adjusted vertically. The turn-on pulse length of the LEDs 304 for each line of the display image is also made variable to make adjustment of the brightness of the whole screen possible.

According to the aforementioned embodiment, there is provided a display apparatus having such a small structure as to be mountable on the head, in which a dot density permitting reproduction of textual information can be achieved. Hence, a method of display is provided which is superior in portability for media handling textual information.

Further, in a structure for visually recognizing a display apparatus using LEDs with two eyes, a simple arrangement is made possible comprising only a single system including an LED array using the existing display elements, etc., a rotary mirror and a fixed mirror.

Furthermore, with an information display apparatus using an LED array, a structure is provided which is reduced in size to such a degree as to permit mounting on the head. As a result, there is provided an information display apparatus superior in portability for media handling textual information.

In addition, an information display apparatus according to the invention not only realizes a simple structure comprising a single system including an LED array using the existing display elements, etc., a rotary mirror and a fixed mirror, but also can be reduced in size by taking into consideration the arrangement of the three elements including the LED array, the rotary mirror and the fixed mirror. Thus the conventional simple principle in which the light emitted from an LED array is sequentially scanned by a rotary mirror is directly applicable.

We claim:

1. Binocular display goggles with a one dimensional light source array scanned to form images of high dot data comprising:

a one dimensional light source device including a plurality of light sources, wherein each light source of the plurality of light sources is turned on/off in accordance with data to be displayed;

a rotary mirror arranged along said one dimensional light source device for scanning light emitted from said light source in a direction perpendicular to said one dimensional light source device to generate a two dimensional image by rotating said rotary mirror around an axis parallel to said one dimensional light source device; and a first lens and a second lens arranged symmetrically with respect to the longitudinal center of said light source device so as to observe said two dimensional image generated by said rotary mirror, wherein said light source device and said first lens and said second lens are arranged in such a manner that the light path length L from said light source device to said first lens and said second lens satisfies the following equation: $\theta \geq \tan^{-1}((L_2/2-L_1/2)L)+\tan^{-1}((L_2/2+L_1/2)L)$ where $L_1$ is a first distance from the center of said first lens to the center of said second lens, $L_2$ is a second distance covering all the light sources, and $\theta$ is the angular field of said first lens and said second lens.

2. Binocular display goggles according to claim 1, further comprising at least first and second prisms which correspond to said first lens and said second lens respectively for adjusting the imaging point of the light emitted from said light source device.

3. Binocular display goggles with a one dimensional light source array scanned to form images of high dot data comprising:

a one dimensional light source device including a plurality of light sources, wherein each light source of the plurality of light sources is turned on/off in accordance with data to be displayed;

a first mirror that is fixed and reflects the light emitted from said light source device;

a rotating second mirror which is arranged along said one dimensional light source device for scanning light emitted from said first mirror, wherein said second mirror rotates in a direction perpendicular to said one dimensional light source device to generate a two dimensional image by rotating said second mirror around an axis parallel to said one dimensional light source device; and a first lens and a second lens arranged symmetrically with respect to the longitudinal center of said light source device so as to observe said two dimensional image generated by said second mirror, wherein said rotating second mirror is arranged with its axis of rotation parallel to said first lens and second lens for visually recognizing the focused light, wherein said light source device is arranged between said first lens and second lens and said second mirror below a horizontal line connecting the center of said first lens and second lens and the axis of rotation of said second mirror in such a manner that the light emitted from said light source device intersects the focused light reflected from said second mirror, and wherein said first mirror is fixedly arranged between said first lens and second lens and said second mirror above a horizontal line connecting the center of said first lens and second lens and the axis of rotation of said second mirror.

4. Binocular display goggles with a one dimensional light source array scanned to form images of high dot data comprising:

a one dimensional light source device including a plurality of light sources, wherein each light source of the plurality of light sources is turned on/off in accordance with data to be displayed;

a first mirror that is fixed and reflects the light emitted from said light source device;

a rotating second mirror which is arranged along said one dimensional light source device for scanning light emitted from said first mirror, wherein said second mirror rotates in a direction perpendicular to said one dimensional light source device to generate a two dimensional image by rotating said second mirror around an axis parallel to said one dimensional light source device; and a first lens and a second lens arranged symmetrically with respect to the longitudinal center of said light source device so as to observe said two dimensional image generated by said second mirror, wherein said rotating second mirror is arranged with its axis of rotation parallel to said first lens and second lens for visually recognizing the focused light, said light source device is arranged opposite of said second mirror with respect to said first lens and second lens below a horizontal line connecting the center of said first lens and second lens and the rotation axis of said second mirror in such a manner that the light emitted from said light source device is directly reflected by said first mirror without being obstructed by the rotating second mirror, and said first mirror fixedly arranged above a horizontal line connecting the center of said first lens and second lens and the rotating axis of said second mirror.

* * * * *